US009911108B2

(12) United States Patent
Hipolito et al.

(10) Patent No.: US 9,911,108 B2
(45) Date of Patent: Mar. 6, 2018

(54) PROCESS OF FACILITATING FINANCIAL TRANSACTIONS AT POINT-OF-SALE EMPLOYING ELECTRONIC DROP SAFES AND POINT-OF-SALE TERMINALS

(71) Applicant: BRINK'S NETWORK, INC., Richmond, VA (US)

(72) Inventors: Gil Geraldo Hipolito, Sao Paulo (BR); Samuel de Alvarenga, Sao Paulo (BR); Emerson Dourado, Sao Paulo (BR)

(73) Assignee: BRINK'S NETWORK, INC., Richmond, VA (US)

( * ) Notice: Subject to any disclaimer, the term of this patent is extended or adjusted under 35 U.S.C. 154(b) by 247 days.

(21) Appl. No.: 14/169,335

(22) Filed: Jan. 31, 2014

(65) Prior Publication Data

US 2015/0154580 A1    Jun. 4, 2015

Related U.S. Application Data

(63) Continuation of application No. 13/596,625, filed on Aug. 28, 2012, now Pat. No. 8,645,214.
(Continued)

(51) Int. Cl.
*G06Q 20/20* (2012.01)
*G06Q 20/10* (2012.01)

(52) U.S. Cl.
CPC ............. *G06Q 20/20* (2013.01); *G06Q 20/10* (2013.01); *G06Q 20/209* (2013.01)

(58) Field of Classification Search
CPC .............................. G06Q 20/20; G06Q 20/209
(Continued)

(56) References Cited

U.S. PATENT DOCUMENTS 3,852,571 A    12/1974 Hall et al.
3,998,155 A    12/1976 Cothran et al.
(Continued)

FOREIGN PATENT DOCUMENTS

CA    2510812    12/2005
EP    0455200    11/1991
(Continued)

OTHER PUBLICATIONS

Internet Archive of applicant's website as captured on Jun. 8, 2004 (Jun. 8, 2004) <https://web.archive.org/web/20040608083944/http://www.us.brinksinc.com/compusafeservice/.
Brinks Webpage Compusafe Service. Jun. 8, 2004. http://web.archive.org/web/20040608125029/ http://www.us.brinksinc.com/com pusafeservice/index.htm.
Coinstar International Form 1 0-K Report for the United States Securities and Exchange Commission. Jul. 30, 2005. http://web.archive.org/web/20050730075723/ http://www.getfili ngs.com/o0001193125-04-025356. Html.
(Continued)

*Primary Examiner* — Vanel Frenel
(74) *Attorney, Agent, or Firm* — Cowan, Liebowitz & Latman, P.C.; Mark Montague

(57) ABSTRACT

An electronic system and process for facilitating a financial transaction comprising a drop safe and a point-of-sale (POS) terminal, disposed at a retailer location, in communication with one another in which the POS terminal receives, from a user, a request to commence a drop request and, in response, instructs the drop safe to commence a drop request, whereupon after acceptance of the drop request the drop safe accepts, via a currency acceptor, currency that is identified and authenticated, and upon completion of the drop, the drop safe ascertains the total amount of accepted currency and transmits the ascertained amount to the POS terminal which then completes the transaction. The drop request may occur during a transaction with a customer for the purchase of goods or services or at other times. Other features are disclosed.

23 Claims, 9 Drawing Sheets

Related U.S. Application Data

(60) Provisional application No. 61/528,836, filed on Aug. 30, 2011.

(58) Field of Classification Search
USPC ............ 705/16, 17, 18, 21, 42, 30; 235/379; 902/13, 17; 194/206
See application file for complete search history.

(56) References Cited

U.S. PATENT DOCUMENTS

| | | |
|---|---|---|
| 4,084,520 A | 4/1978 | Frier |
| 4,314,352 A | 2/1982 | Fought |
| 4,674,060 A | 6/1987 | Larkin et al. |
| 5,025,372 A | 6/1991 | Burton et al. |
| 5,051,900 A | 9/1991 | Ito et al. |
| 5,117,355 A | 5/1992 | McCarthy |
| 5,252,811 A | 10/1993 | Henochowicz et al. |
| 5,265,007 A | 11/1993 | Barnhard, Jr. et al. |
| 5,326,960 A | 7/1994 | Tannenbaum |
| 5,564,546 A | 10/1996 | Molbak et al. |
| 5,583,759 A | 12/1996 | Geer |
| 5,620,079 A | 4/1997 | Molbak |
| 5,630,073 A | 5/1997 | Nolan |
| 5,668,897 A | 9/1997 | Stolfo |
| 5,695,038 A * | 12/1997 | Keith, III ............... G07F 9/06 194/206 |
| 5,704,491 A | 1/1998 | Graves |
| 5,717,868 A | 2/1998 | James |
| 5,774,663 A | 6/1998 | Randle et al. |
| 5,787,403 A | 7/1998 | Randle |
| 5,813,510 A | 9/1998 | Rademacher |
| 5,899,982 A | 5/1999 | Randle |
| 5,910,988 A | 6/1999 | Ballad |
| 5,920,848 A | 7/1999 | Schutzer et al. |
| 5,930,788 A | 7/1999 | Wical |
| 5,944,163 A | 8/1999 | Keith, III et al. |
| 5,950,179 A | 9/1999 | Buchanan et al. |
| 5,963,647 A | 10/1999 | Downing et al. |
| 5,974,146 A | 10/1999 | Randle et al. |
| 5,975,275 A | 11/1999 | Keith, III et al. |
| 6,032,137 A | 2/2000 | Ballard |
| 6,067,530 A * | 5/2000 | Brooks, Jr. ........... G06Q 20/206 194/206 |
| 6,105,007 A | 8/2000 | Norris |
| 6,105,009 A | 8/2000 | Cuervo |
| 6,119,106 A | 9/2000 | Mersky et al. |
| 6,182,052 B1 | 1/2001 | Fulton et al. |
| 6,202,054 B1 | 3/2001 | Lawlor et al. |
| 6,328,208 B1 | 12/2001 | Artino et al. |
| 6,341,272 B1 | 1/2002 | Randle |
| 6,405,182 B1 | 6/2002 | Cuervo |
| 6,523,742 B1 | 2/2003 | Awatsu et al. |
| 6,547,132 B1 | 4/2003 | Templeton et al. |
| 6,594,647 B1 | 7/2003 | Randle et al. |
| 6,626,357 B1 | 9/2003 | Ross |
| 6,659,340 B2 | 12/2003 | Siemens |
| 6,885,281 B2 | 4/2005 | McGunn et al. |
| 6,896,177 B2 | 5/2005 | Carter |
| 7,063,252 B2 | 6/2006 | Smith et al. |
| 7,070,093 B2 | 7/2006 | Siemens et al. |
| 7,111,754 B1 | 9/2006 | Siemens |
| 7,113,929 B1 | 9/2006 | Beach et al. |
| 7,143,933 B2 | 12/2006 | Uemastu et al. |
| 7,191,151 B1 | 3/2007 | Nosek |
| 7,207,478 B1 | 4/2007 | Blackson et al. |
| 7,216,098 B1 | 5/2007 | Brooks et al. |
| 7,219,083 B2 | 5/2007 | Bellucci et al. |
| 7,264,150 B1 | 9/2007 | Moreland et al. |
| 7,428,985 B1 | 9/2008 | Moreland et al. |
| 7,472,826 B2 | 1/2009 | Valiance |
| 7,520,421 B2 | 4/2009 | Salafia, III et al. |
| 7,610,215 B1 | 10/2009 | Folk et al. |
| 7,624,919 B2 | 12/2009 | Meek et al. |
| 7,635,085 B2 | 12/2009 | Brown |
| 7,681,707 B2 | 3/2010 | Tabachnik |
| 7,798,396 B1 * | 9/2010 | Moreland ........... G07D 11/0063 235/379 |
| RE42,820 E | 10/2011 | Vallance |
| RE43,888 E | 1/2013 | Vallance |
| 2001/0054643 A1 | 12/2001 | Siemens |
| 2002/0011393 A1 | 1/2002 | Siemens |
| 2002/0063034 A1 | 5/2002 | Dobbins |
| 2002/0087468 A1 | 7/2002 | Ganesan et al. |
| 2002/0091637 A1 | 7/2002 | Bent et al. |
| 2002/0100399 A1 | 8/2002 | Young |
| 2002/0145035 A1 | 10/2002 | Jones |
| 2003/0080185 A1 | 5/2003 | Werther |
| 2003/0105709 A1 | 6/2003 | Orlando |
| 2003/0116622 A1 | 6/2003 | Suttie et al. |
| 2003/0191722 A1 | 10/2003 | Thompson et al. |
| 2003/0208438 A1 | 11/2003 | Rothman |
| 2003/0208439 A1 | 11/2003 | Rast |
| 2004/0139000 A1 | 7/2004 | Amos |
| 2004/0148254 A1 | 7/2004 | Hauser |
| 2004/0193537 A1 | 9/2004 | Knapp |
| 2004/0210515 A1 * | 10/2004 | Hughes ............... E05G 1/06 705/39 |
| 2004/0226493 A1 | 11/2004 | Siemens et al. |
| 2004/0267673 A1 | 12/2004 | Ballard et al. |
| 2005/0010525 A1 | 1/2005 | Ross et al. |
| 2005/0083176 A1 * | 4/2005 | Yamada ............... G01C 21/26 340/5.73 |
| 2005/0096986 A1 | 5/2005 | Taylor et al. |
| 2005/0108164 A1 | 5/2005 | Salafia, III et al. |
| 2005/0187876 A1 | 8/2005 | Gessler |
| 2005/0228733 A1 | 10/2005 | Bent et al. |
| 2006/0036537 A1 | 2/2006 | Lawrence et al. |
| 2006/0106716 A1 | 5/2006 | Hurwitz et al. |
| 2006/0253332 A1 * | 11/2006 | Dobbins ........... G07D 11/0096 705/21 |
| 2006/0253349 A1 | 11/2006 | Brooks, Jr. et al. |
| 2006/0282271 A1 | 12/2006 | Ananda et al. |
| 2007/0108267 A1 | 5/2007 | Jonsson et al. |
| 2007/0130063 A1 | 6/2007 | Jindia et al. |
| 2007/0194102 A1 | 8/2007 | Cohen et al. |
| 2008/0120232 A1 | 5/2008 | Herrin et al. |
| 2008/0123932 A1 | 5/2008 | Jones et al. |
| 2008/0301049 A1 | 12/2008 | Dyson |
| 2009/0006249 A1 | 1/2009 | Morgan et al. |
| 2009/0018959 A1 | 1/2009 | Doran et al. |
| 2010/0131374 A1 * | 5/2010 | Sanders ............... G06Q 20/20 705/16 |
| 2011/0011927 A1 | 1/2011 | Dobbins |

FOREIGN PATENT DOCUMENTS

| | | |
|---|---|---|
| EP | 1445744 | 11/2004 |
| GB | 807880 | 1/1959 |
| GB | 2079846 | 1/1982 |
| GB | 2130299 A | 5/1984 |
| GB | 2326671 A | 12/1998 |
| JP | 58195272 | 11/1983 |
| RU | 64677 | 7/2007 |
| WO | 0046728 A2 | 8/2000 |
| WO | 0111528 | 2/2001 |
| WO | 0293457 | 11/2002 |

OTHER PUBLICATIONS

Brinks Webpage on Logistics Solutions Oct. 26, 2005. http://web.archive.org/web/20051026013157/ http://www.brinksinc.com/solutions and_services/index.html.

Brinks Webpage on Compusafe Service. Dec. 16, 2005. http://web.archive.org/web/2005121 6122333/ http://www.us.brinksinc.com/high_tech_solutions/compusafe overview.Html.

Brinks Fact Sheet on Compusafe Service. Nov. 13, 2006. http://web.archive.org/web/2006111323425/ www.us.brinksinc.com/high_tech_solutions/factsheet.pdf.

Brinks Brochure on Compusafe Service. Nov. 13, 2006. http://web.archive.org/web/20061113232349/www.us.brinksinc.com/high_tech_solutions/Final_CompusafeFolder2005.pdf.

(56) References Cited

OTHER PUBLICATIONS

Ferrari, Michael. Thinking Outside the Safe Box. Apr. 2007. Convenience Store Decisions. p. 34-35.
Brink's Helps Retailers Turn Cash Receipts Into Investable Funds Faster, Oct. 20, 2008 wvvw.pr-inside.com/print870847.htm.

* cited by examiner

PROCESS OF FACILITATING FINANCIAL TRANSACTIONS AT POINT-OF-SALE EMPLOYING ELECTRONIC DROP SAFES AND POINT-OF-SALE TERMINALS

REFERENCE TO RELATED APPLICATIONS

This application is a continuation of U.S. Non-Provisional patent application Ser. No. 13/596,625, filed Aug. 28, 2012, which claims priority to U.S. Provisional Patent Application No. 61/528,836, filed Aug. 30, 2011, both of which are incorporated herein in their entirety by reference.

FIELD OF THE INVENTION

The present invention pertains to system for and process of facilitating financial transactions at the point-of-sale employing electronic drop safe and point-of-sale terminals. More particularly, the present invention pertains to a system having both an electronic drop safe and a point-of-sale (POS) terminal, both suitably programmed, operating in communication with one another to provide various improved and unique functionality during point-of-sale activity.

BACKGROUND OF THE INVENTION

Point of sale (POS) refers to the location (i.e., physical location) where a transaction, such as a consumer purchase transaction, occurs. Retailers that sell goods or services purchase or lease equipment to facilitate consumer purchase transactions. A typical retailer uses a computer, a cash drawer, a receipt printer, a barcode scanner, etc., to carry out transactions. Today, all of these components are integrated in electronic cash registers. In addition, retailers that accept cash often have one or more safes, which are typically stored in the facility's back-office. In general, when a cashier ends his/her shift, money within the cashier's register is put into the safe. Money is put into the safe for other reasons. In any event, safes are used to secure the money until the money is withdrawn, which is often carried out by armored car personnel.

In addition to the above-mentioned equipment, retailers now commonly use so-called point-of-sale (POS) electronic funds transfer (EFT) devices to facilitate the processing of credit and debit card transactions. These devices, which generally are portable (i.e., hand-held), have added significant convenience and speed to the retail checkout process.

OBJECTS AND SUMMARY OF THE INVENTION

It is an object of the present invention to modify existing devices in novel manners so that they cooperate together to achieve additional convenience and other benefits to retailers, as well as to consumers. Such other benefits are discussed below.

To achieve the foregoing and other objects, the present invention entails an electronic system for facilitating a financial transaction at the point-of-sale that comprises a drop safe disposed at a retailer location, the drop safe having a currency acceptor, an internal cassette, a processor and a communication device, the currency acceptor accepting and authenticating currency fed into the currency acceptor and transferring authenticated currency into the internal cassette, the processor producing deposit reports identifying contents within the sealed cassette, and the communication device capable of transmitting information. The system also has a point-of-sale (POS) terminal disposed at the retailer location. The POS terminal is portable and includes a processor, an input device, a display, and a communication device capable of communicating with the communication device of the drop safe. The processor of the POS terminal is programmed to commence a drop function upon receipt, via the input device, from a user of the POS terminal of a commence drop function instruction, and control the communication device of the POS terminal to transmit a drop request to the drop safe. The processor of the drop safe is programmed to accept the drop request, transmitted by the communication device of the POS terminal and received by the communication device of the drop safe, after carrying out a verification of an appropriateness of the drop request, control the communication device of the drop safe to transmit, upon acceptance of the drop request by the drop safe, a unique Drop ID to the POS terminal, the Drop ID representing the respective drop to be carried out, control, after acceptance of the drop request, the currency acceptor of the drop safe to receive currency fed into the currency acceptor, ascertain a total amount of currency received and authenticated by the currency acceptor, and control the communication device of the drop safe to transmit to the POS terminal the ascertained total amount of currency received and authenticated by the currency acceptor.

As an aspect of the present invention, the drop safe optionally does not include a keypad or a display.

As a further aspect of the present invention, the POS terminal includes a reader capable of reading identification information from a credit card and/or a debit card.

As another aspect of the present invention, the processor of the POS terminal is programmed to prompt the user, via the input device, to initiate the drop function during a transaction for a purchase of goods or services by a customer.

As a feature of this aspect, the processor of the POS terminal is programmed to ascertain a total amount of the cost to purchase the goods or services by the customer, and to prompt the user to initiate the drop function after the total amount of the cost to purchase the goods or services is ascertained by the POS terminal.

As another feature of this aspect, the processor of the POS terminal is programmed to ascertain an identity of each item to be purchased by the customer, to ascertain a respective cost of each identified item to be purchased, and to ascertain a total amount of the cost to purchase all the items to be purchased by the customer.

As another aspect of the present invention, the input device of the POS terminal includes a dedicated input key selectable by a user to instruct the POS terminal to commence the drop function.

As yet a further aspect of the present invention, the processor of the POS terminal is programmed to prompt the user to enter a tender type upon receipt of the commence drop function instruction, and to receive, via the input device, the tender type, the tender type being a bill validator drop or a manual drop, and the processor of the drop safe is programmed to control the currency acceptor to accept currency if the tender type received by the POS terminal is a bill validator drop.

As a feature of this aspect, the processor of the drop safe is programmed to control the drop safe to accept a manual drop if the tender type received by the POS terminal is a manual drop, the manual drop representing an envelope containing currency and/or a check.

As a further aspect of the present invention, the processor of the POS terminal is programmed to receive an amount to be dropped, the amount to be dropped representing a total amount of currency to be received by the drop safe.

As another aspect of the present invention, the processor of the POS terminal is programmed to control the communication device of the POS terminal to transmit to the drop safe an identification of the user of the POS terminal, and the processor of the drop safe is programmed to include, during the verification of the appropriateness of the drop request, a verification of the transmitted identification of the user of the POS terminal.

As yet another aspect of the present invention, the processor of the drop safe is programmed to associate the unique Drop ID with an amount of the respective drop, an identity of the user of the POS terminal, and the date and time of the respective drop.

As still yet a further aspect of the present invention, the processor of the POS terminal is programmed to control the communication device of the POS terminal to periodically transmit, to the drop safe, a query for a status of the drop safe during activity being carried out after acceptance, by the drop safe, of the drop request.

As a feature of this aspect, the processor of the POS terminal is programmed to include the Drop ID with each query transmitted to the drop safe, and the processor of the drop safe is programmed to control the communication device of the drop safe to respond to each query with a status of activity pertaining to the transmitted Drop ID.

As still yet another aspect of the present invention, the processor of the POS terminal is programmed to prompt the user to enter a tender type, and to receive, via the input device, a tender type of a bill validator drop or a payment by check, and the processor of the drop safe is programmed to control the currency acceptor to accept currency if the received tender type is a bill validator drop, and to control an imager in or associated with the drop safe to scan the check to produce an image file if the received tender type is payment by check.

As a feature of this aspect, the processor of the drop safe is programmed to capture select information from the image file representing the scanned check, the select information including a payee, an amount of the check, and/or a routing/account number of the check.

As another feature of this aspect, the processor of the drop safe is programmed to control the communication device of the drop safe to transmit, to the POS terminal, the image file of the check, and the POS terminal includes a printer, and the processor of the POS terminal is programmed to control the printer to print a receipt having printed thereon an image of the check using the transmitted image file.

As a further aspect of the present invention, the processor of the POS terminal is programmed to initiate an End-of-Day process and to control the communication device of the POS terminal to transmit, to the drop safe, an end-of-day instruction upon initiation of the End-of-Day process, and the processor of the drop safe is programmed to effect a change of business day upon receipt, by the communication device of the drop safe, of the end-of-day instruction.

As another aspect of the present invention, the POS terminal includes a printer, and the processor of the POS terminal is programmed to initiate a print select report process and to control the communication device of the POS terminal to transmit to the drop safe, after initiating the print select report process, a request for a select report, and the processor of the drop safe is programmed to control the communication device of the drop safe to transmit, to the POS terminal, report data corresponding to the transmitted requested report, and the processor of the POS terminal is further programmed to control the printer to print a report using the report data transmitted by the drop safe.

As a feature of this aspect, the select report is a cashier detail report, a regular shift report or a day report.

As yet a further aspect of the present invention, the processor of the POS terminal is programmed to prompt, via the input device, the user of the POS terminal to initiate the drop function during a bill payment transaction in which a customer desires to pay a bill, and the currency accepted by the currency acceptor of the drop safe is from the customer for the purpose of paying the bill.

In accordance with a process embodiment of the present invention, an inventive process of facilitating a financial transaction comprises prompting, by a portable POS terminal, a user of the POS terminal to initiate a drop function, receiving, by the POS terminal from the user, a commence drop function instruction, transmitting, by the POS terminal to a drop safe, a drop request, transmitting, by the drop safe to the POS terminal upon acceptance of the drop request by the drop safe, a unique Drop ID representing the respective drop to be carried out, receiving currency by a currency acceptor of the drop safe after acceptance of the drop request, identifying, by the drop safe, an amount of each received currency and verifying, by the drop safe, an authenticity of said each received currency, completing the drop function, and transmitting, by the drop safe to the POS terminal, a total amount of the currency received and verified by the drop safe.

As an aspect of this embodiment, prompting the user of the POS terminal to initiate the drop function is carried out during a transaction for a purchase of goods or services by a customer, and the user of the POS terminal is a cashier of a retailer from which the customer is purchasing the goods or services.

As a feature of this aspect, the process further comprises receiving, by the POS terminal, a total amount of the cost to purchase the goods or services by the customer, and prompting the user of the POS terminal to initiate the drop function is executed upon the POS terminal's receipt of the total amount of the cost to purchase the goods or services by the customer.

As another feature, the process further comprises ascertaining, by the POS terminal, an identity of each item to be purchased by the customer, ascertaining, by the POS terminal, a respective cost of each identified item to be purchased, and ascertaining, by the POS terminal, a total amount of the cost to purchase all the items to be purchased by the customer, and prompting the user of the POS terminal to initiate the drop function is executed upon the POS terminal's ascertaining of the total amount of the cost to purchase all the items to be purchased by the customer.

As a further aspect, the step of receiving, by the POS terminal from the user, a commence drop function instruction comprises identifying, by the POS terminal, of a selection by the user of a dedicated input key on the POS terminal.

As yet another aspect, the process further comprises prompting, by the POS terminal in response to receipt of the drop function instruction, the user to enter a tender type, receiving, by the POS terminal from the user, the tender type, wherein the received tender type is a bill validator drop or a manual drop, and the step of receiving currency by the currency acceptor of the drop safe is commenced only if the received tender type is a bill validator drop.

As a feature of this aspect, the process further comprises receiving, by the drop safe, a manual drop if the received tender type is a manual drop, and the manual drop represents an envelope containing currency and/or a check.

As a further aspect, the process further comprises receiving, by the POS terminal, an amount to be dropped, the amount to be dropped representing a total amount of currency to be received by the drop safe.

As yet another aspect, the process further comprises verifying, by the drop safe, an appropriateness of the drop request, wherein the drop safe does not accept the drop request if the drop request is not verified to be appropriate.

As a feature of this aspect, the process further comprises transmitting, by the POS terminal to the drop safe, an identification of the user of the POS terminal, and the step of verifying, by the drop safe, the appropriateness of the drop request includes verifying the transmitted identification of the user of the POS terminal.

As an additional aspect, the Drop ID is associated with an amount of the respective drop, an identity of the user of the POS terminal, and the date and time of the respective drop.

As a further aspect, the step of receiving currency comprises receiving by the currency acceptor of the drop safe currency that is manually fed by the user of the POS terminal.

As yet a further aspect, the process comprises transferring, by the drop safe, each received and verified currency within a secure, internal cassette disposed within the drop safe.

As yet another aspect, the process further comprises periodically querying, by the POS terminal, the drop safe to ascertain a status of the drop safe while receiving the currency.

As a feature of this aspect, the POS terminal, during each query, transmits the Drop ID to the drop safe, and the drop safe, in response to each said query, transmits the status of drop activity corresponding to the transmitted Drop ID.

Still as yet a further aspect, the step of completing the drop function occurs after receipt, by the POS terminal or the drop safe, from the user of an instruction designating the drop is complete.

Still as yet another aspect, the process further comprises prompting, by the POS terminal in response to receipt of the drop function instruction, the user to enter a tender type, receiving, by the POS terminal from the user, the tender type, wherein the received tender type is a bill validator drop or a payment by check, the step of receiving currency by the currency acceptor of the drop safe is commenced only if the received tender type is a bill validator drop, the process further comprising scanning, by an imager in or associated with the drop safe, a check to produce an image file if the received tender type is payment by check.

As a feature of this aspect, the process further comprises capturing, by the drop safe, select information from the image file representing the scanned check, the select information including at least a payee, an amount of the check, and/or a routing/account number of the check.

As another feature of this aspect, the process further comprises transmitting, by the drop safe to the POS terminal, the image file of the check, and printing, by the POS terminal, a receipt having printed thereon an image of the check using the transmitted image file.

As a further aspect, the process further comprises initiating, by the POS terminal, an End-of-Day process, wherein the POS terminal, upon initiating the End-of-Day process transmits to the drop safe an end-of-day instruction, and effecting a change of business day, by the drop safe, upon receipt of the end-of-day instruction.

As yet another aspect, the process comprises initiating, by the POS terminal, a print select report process, wherein the POS terminal, upon initiating the print select report process transmits to the drop safe a request for a select report, transmitting, by the drop safe to the POS terminal, report data corresponding to the requested report, and printing, by the POS terminal, a report using the report data transmitted by the drop safe.

As a feature of this aspect, the select report is a cashier detail report, a regular shift report or a day report.

As yet another aspect, the step of prompting the user of the POS terminal to initiate the drop function is carried out during a bill payment transaction in which a customer desires to pay a bill, and wherein the currency received by the drop safe is from the customer for the purpose of paying the bill.

Various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PRESENT INVENTION

Figure 1:
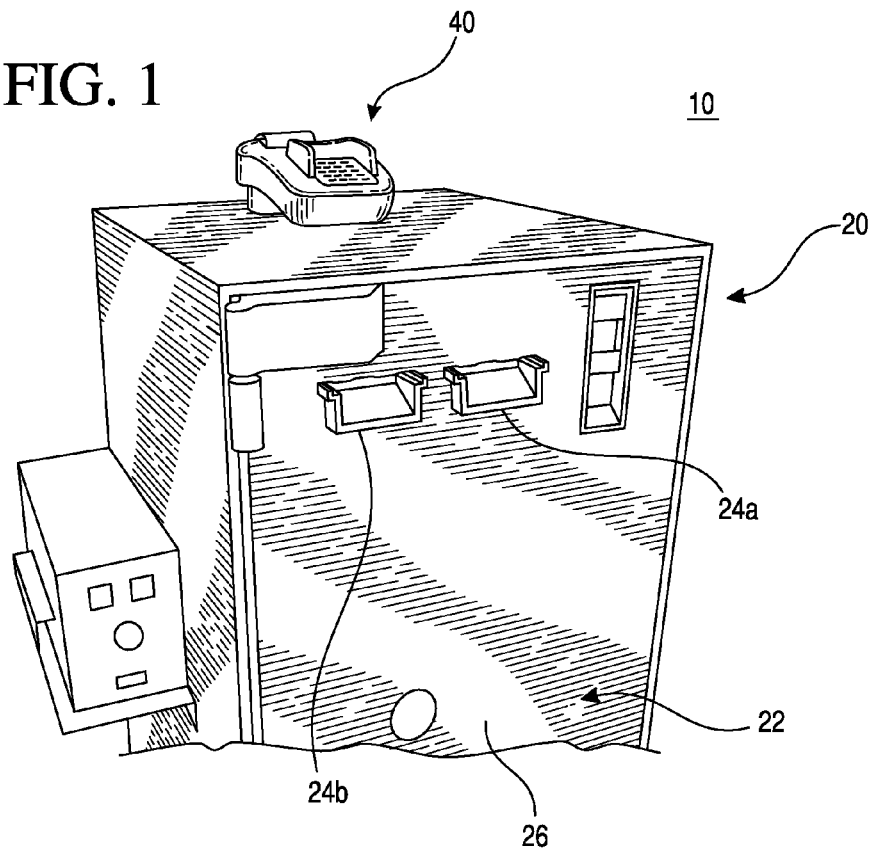
FIG. 1 is an image of an exemplary system employing the present invention.

The system and process of facilitating financial transactions at the point-of-sale employing electronic drop safe and point-of-sale terminals in accordance with the present invention, also called herein point-of-sale (POS) CompuSafe® system and method, are innovations that significantly reduce costs and increase functionality in handling various commercial transactions as compared to when traditional electronic devices are employed to carry out such transactions. As described in further detail below, the present invention, also hereinafter referred to as, for convenience, "POS CompuSafe®" or "system of the present invention" or the like is comprised of an electronic drop safe and a point-of-sale (POS) terminal, both suitably programmed, in communication with one another that collectively carry out various transactions that provide at least the following benefits:

Benefits:

Reduction in number of separate components in the safe;

Reduction in the cost of these components by approximately 75%;

Reduced maintenance cost;

Adds PCI compliance to the traditional CompuSafe® safe;

Adds ability to process credit and debit card transactions by the CompuSafe® safe;

Adds ability to combine the collection and processing of all payment types (Cash, Debit, Credit, Check, etc.) in one device for a retailer;

Incorporates within the system the ability to process bill payment transactions; and Other benefits as discussed below and appreciated from the description herein.

The Point of Sale CompuSafe® System of the present invention includes an electronic drop safe (also called herein, for convenience, "drop safe" or simply "safe") with certain capability, as herein described. As one example, a suitable drop safe that may be employed and modified as needed for use within the herein-described system and process of the present invention is the Brink's CompuSafe® 4000 safe. A discussion of the Brink's CompuSafe® 4000 safe is provided at Brink's Inc.'s website at http://www.us.brinksinc.com/services/compusafe_service_4000.aspx and http://www.us.brinksinc.com/services/pdf/4000Series.pdf.

As another example, Brink's CompuSafe® 5000 safe may be employed and modified as needed within the system of the present invention. The CompuSafe® 5000 safe is a dual note acceptor type safe that fits under-the-counter or in the back-office of, for example, a retail establishment and allows employees the ability to take cash from customers and secure it immediately inside the safe. A discussion of the Brink's CompuSafe® 5000 safe is provided at Brink's Inc.'s website at http://www.us.brinksinc.com/services/compusafe_service_5000.aspx.

Some of the features of the Brink's CompuSafe® 4000 safe and the Brink's CompuSafe® 5000 safe are discussed in U.S. Pat. Nos. 5,695,038; 5,975,275; and 5,944,163, which are assigned to the assignee of the present application and are incorporated herein by reference.

In both the Brink's CompuSafe® 4000 safe and the Brink's CompuSafe® 5000 safe, and as discussed in the above-identified patents, bill acceptors within the safe accept the cash and transfer the accepted cash into sealed cassettes disposed within the safe, and a processor produces deposit reports that identify the contents of the sealed cassettes. The deposit reports specifically identify the stored contents by denomination, the total cash deposit, and other information. The Brink's CompuSafe® 4000 safe and the Brink's CompuSafe® 5000 safe, however, are only exemplary safes that may be employed and modified as herein described within the system and method of the present invention. It is noted that the Brink's name and the CompuSafe® mark are registered trademarks of Brink's Network, Inc., the assignee of the present application.

In addition to an electronic safe, the present invention includes a point-of-sale (POS) electronic funds transfer (EFT) device, as herein described. Generic POS-EFT devices are well known and are often referred to as point-of-sale (POS) terminals. POS terminals are employed at retail establishments to process credit and debit card transactions. In a retail establishment, POS terminals have become the preferred way of processing credit cards, debit cards, checks, electronic benefits transfers (EBTs) and other electronic transactions in the traditional retail/restaurant environment. These terminals are used in "face-to-face" transactions where customers provide retailers with a card of some sort (e.g., credit card, debit card), the merchant swipes the customer's card through the POS terminal, keys in payment information and the terminal does the rest. There are many types of POS terminals available to retailers and some of these POS terminals are programmable.

Figure 2:
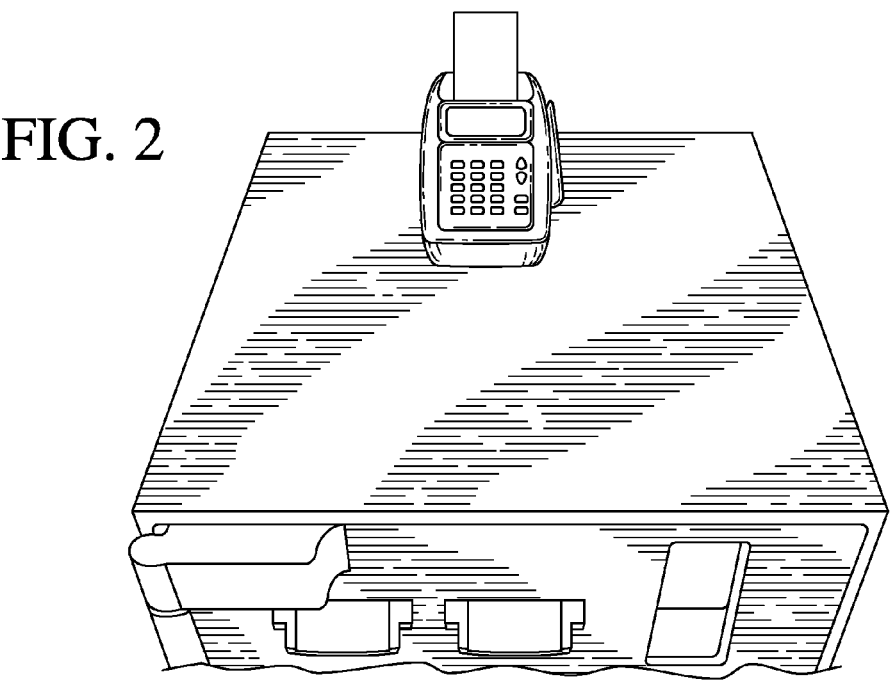
FIG. 2 is another image of the exemplary system employing the present invention.

Now referring to the accompanying figures, FIGS. 1-6 show an exemplary point-of-sale CompuSafe® system of the present invention, which is comprised of a suitably programmed electronic safe and a suitably programmed point-of-sale (POS) terminal. Referring to, for example, FIG. 1, the system 10 of the present invention includes an electronic safe 20 and a POS terminal 40. FIG. 2 is another image showing POS terminal 40 resting on top of the electronic safe.

Figure 3:
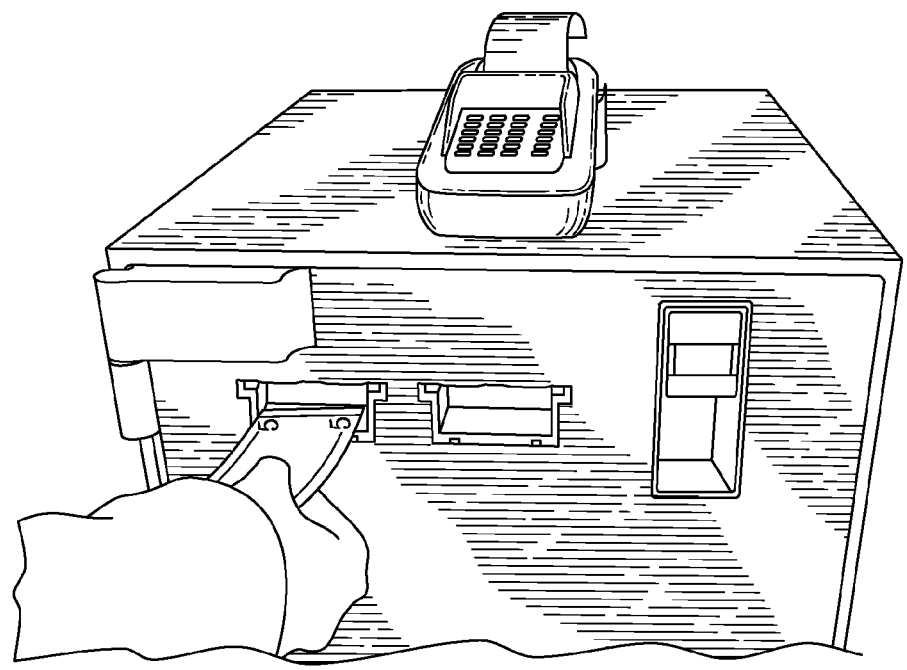
FIG. 3 shows the insertion of a bill within a currency acceptor of the electronic drop safe that is a part of the system of the present invention.
Figure 4:
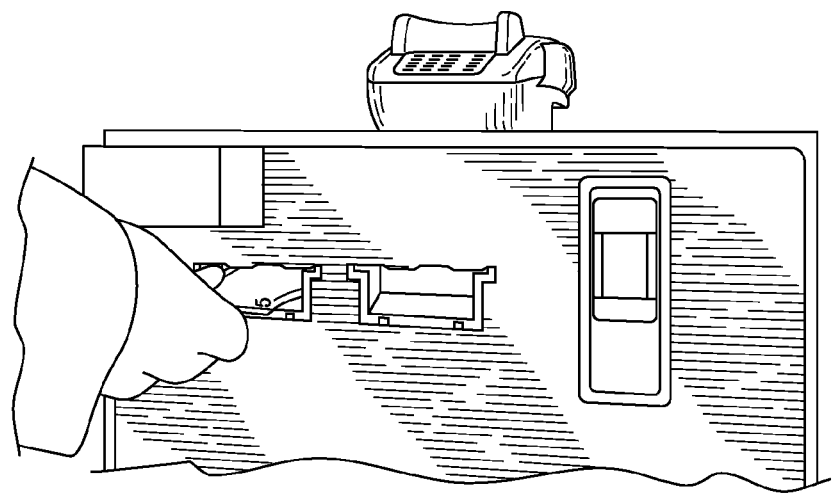
FIG. 4 is another image showing the insertion of a bill within a currency acceptor of the electronic drop safe that is a part of the system of the present invention.

As shown in FIG. 1, electronic drop safe 20 of the present invention includes a safe 22, currency acceptors 24 (24a, 24b), cassettes, a programmed processor, and a communication device. Safe 22, accessible via a locked door 26, contains at least one cassette (not shown in the figures) for storing currency that has been accepted by one of the currency acceptors. Each currency acceptor includes a slot for presenting currency for acceptance and operates in a manner well known in the art. As shown in FIGS. 3 and 4, a bill (currency) is inserted into a currency acceptor, which is then drawn into the safe through the slot. The bill then is examined to evaluate its authenticity. If the bill passes examination, the acceptor transfers that bill to a currency cassette contained within the safe. Bills that do not pass examination are rejected and not stored within the cassette. Each cassette is sealed, locked and accessible only to appropriate personnel, such as an armored-car messenger, with access to the safe. Since the construction and operation of a drop safe that includes one or more currency acceptors and currency cassettes, as well as the manner of removal of a currency cassette from the safe, are well-known in the art, further description thereof is not provided herein except where necessary for an understanding of the present invention. As one example, the construction and description of a suitable drop safe is described in U.S. Pat. No. 5,695,038, which is incorporated herein by reference.

Electronic safe 20 of the present invention further includes, as mentioned above, a programmed processor and a communication device. Programmed processor 30, along with associated memory 36, shown in the schematic illustration of FIG. 7, disposed within electronic safe 20 functions as a central processing unit (CPU) for the system and, along with associated memory, accepts signals from the currency acceptors 24 and other subsystems of the electronic safe, such as the mechanism for opening the safe's door. Processor 30 also is in communication with a communication device 32 disposed within the electronic safe 20. Communication device 32 of electronic safe 20 communicates with POS terminal 40 as further discussed below. Also, processor 30 and the other electronic devices within electronic safe 20 are suitably supplied with a source of power, as is well known in the art.

Figure 5:
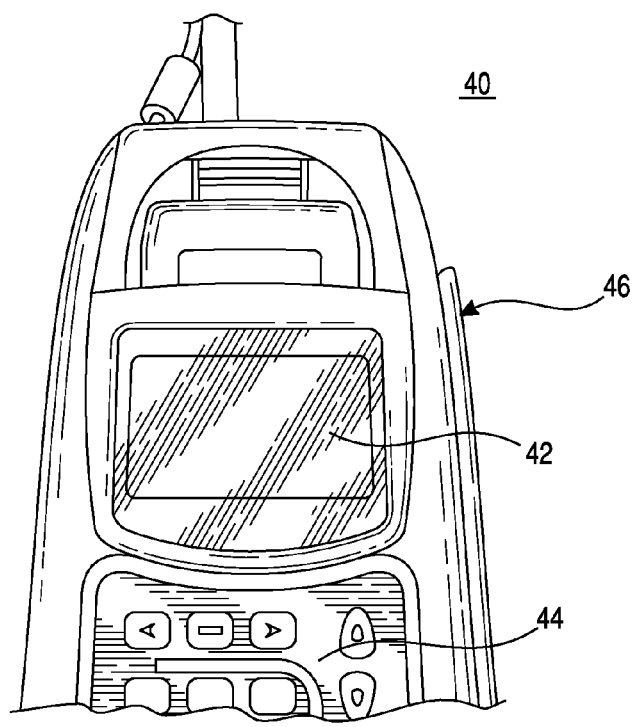
FIG. 5 is an image of an exemplary point-of-sale terminal that may be employed within the system of the present invention.
Figure 6:
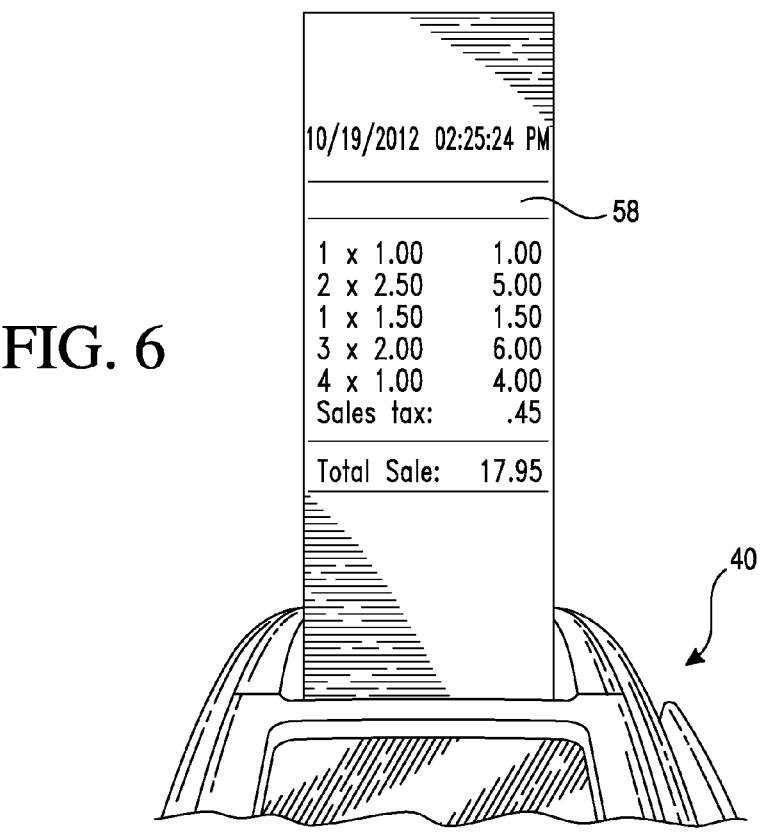
FIG. 6 shows a portion of an exemplary point-of-sale terminal, with a printed receipt, employed within the system of the present invention.

The POS terminal 40 of the point-of-sale CompuSafe® system of the present invention is portable and sufficiently small to be held and includes various components including, with reference to the exemplary POS terminal shown in FIG. 5, a display 42, a keypad 44, a card reader 46, as well as other components (not shown in FIG. 5) including a POS terminal communication component, a POS terminal processor, and memory. These components are well known and thus further description thereof is not provided herein except where necessary for an understanding of the present invention. As further discussed below, the POS terminal may include an integrated printer that prints receipts, such as shown in FIG. 6.

Figure 7:
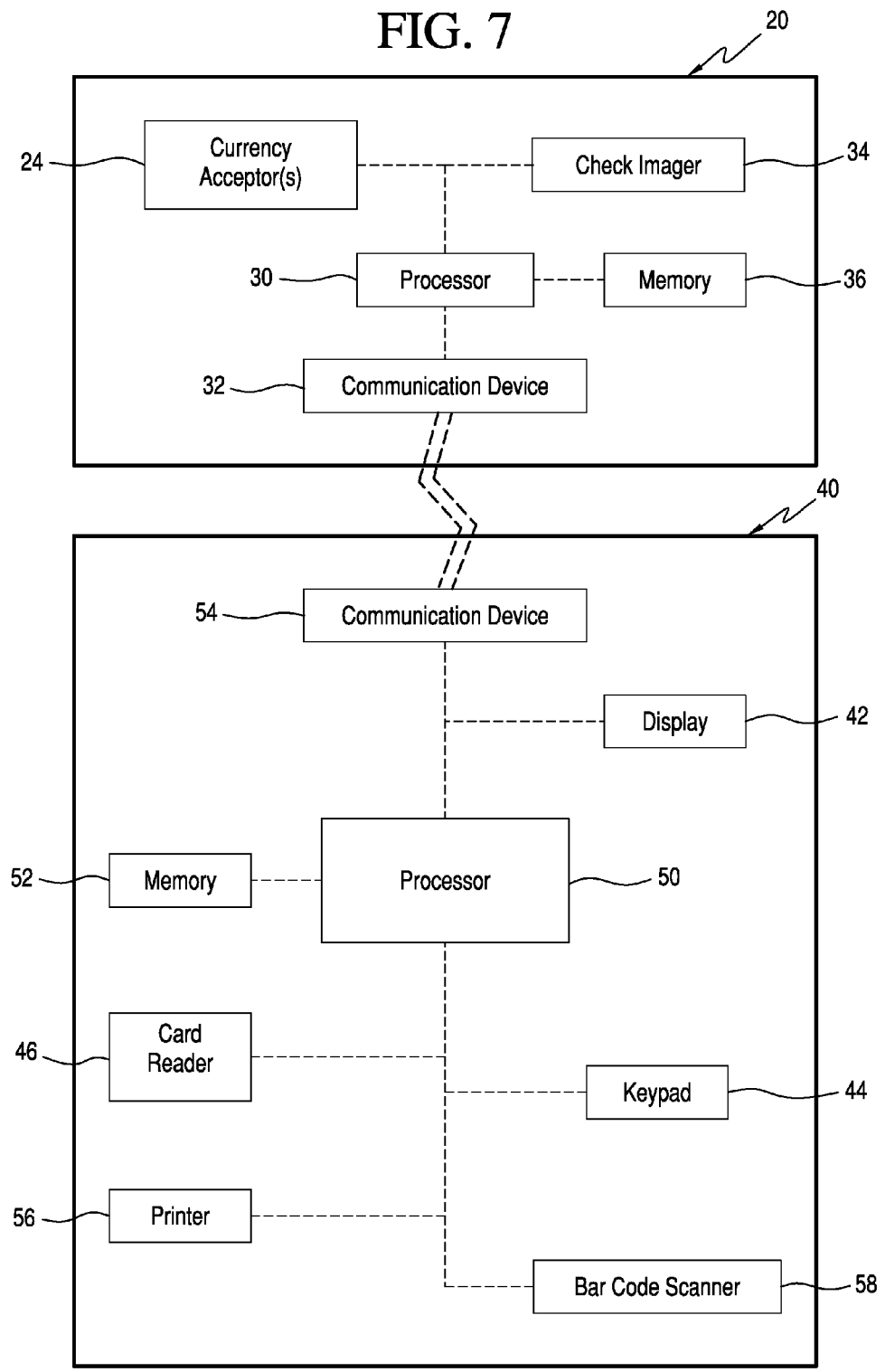
FIG. 7 is a schematic illustration of the system of the present invention.

In accordance with the present invention, and with reference to the block diagram of FIG. 7, POS terminal 40 includes a processor 50, memory 52, and a communication component 54 that is in communication, preferably, in wireless communication with communication device 32 of electronic safe 20. Also as shown in FIG. 7, POS terminal 40 includes the components mentioned above including display 42, keypad 44 and card reader 46. The POS terminal may include various additional components and capability including a printer 56, a bar code scanner 58, and an IC (integrated chip) reader.

Processor 50 and associated memory 52 of POS terminal 40 are programmed to implement standard credit card and debit card transactions and, in accordance with the present invention, the operation of POS terminal 40 by a merchant is highly similar to that of credit card and debit card transactions by standard POS terminals that are not used with an electronic safe. During various other transactions, including cash transactions. POS terminal 40 in communication with electronic safe 20 operate in accordance with the present invention as described further below.

For purposes herein, a merchant is any entity that provides goods and/or services, such as a retailer (e.g., a grocery store), a restaurant, etc. For convenience, the generic term "retailer," the term "merchant" and the term "commercial establishment" are interchangeably used herein to refer to an entity that provides goods and/or services. Also for purposes herein, a cashier of a merchant shall mean an individual, such as an employee of the merchant, operating the system of the present invention. Thus, a manager or other individual who does not officially have the title "cashier" still is a casher for purposes of the discussion herein if such individual is carrying out any of the operations described herein.

Bill Validator Drop

Figure 8:
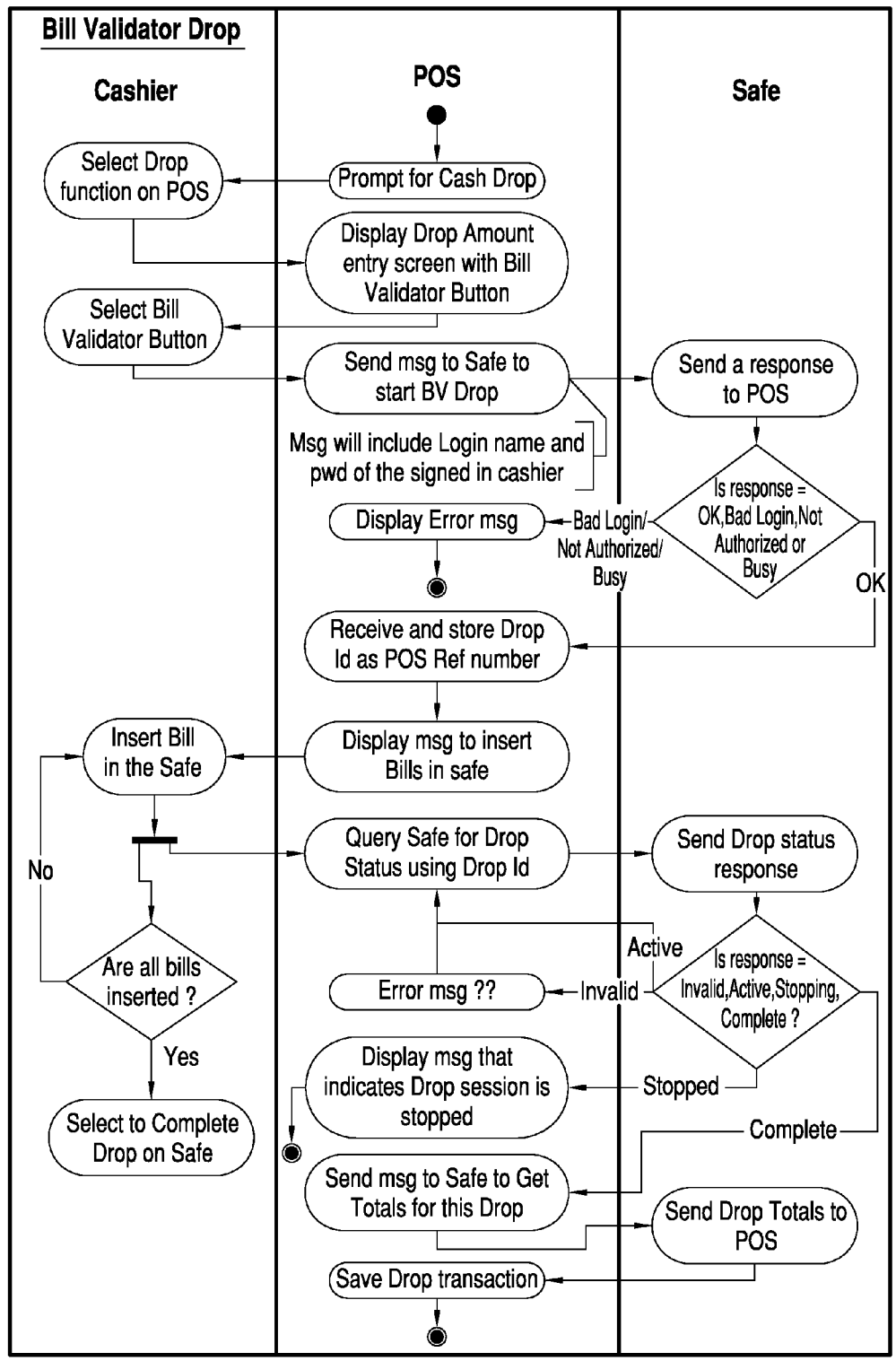
FIG. 8 is a schematic illustration of the bill validator drop function of the present invention.

FIG. 8 is a schematic flow diagram of the bill validator (BV) drop function that is carried out by the system of the present invention. As shown. POS terminal 40 initially prompts, via display 42 (e.g., see FIGS. 5, 7), the cashier to make a cash "drop." As discussed in greater detail below, the POS terminal requests a cash drop during or after various events, such as either during or after a cash transaction by a customer or when an associated cash register contains an amount of cash that exceeds a predetermined threshold, or other times in which a cash drop in the electronic safe is desired.

Upon being prompted to make a cash drop, the cashier selects the "Drop" function on the POS terminal's keypad 44. The "Drop" function may be a pre-programmed button on keypad 44 or a menu selection (e.g., via a menu displayed on display 42) or other suitable technique. Similarly, other "buttons" mentioned herein may be a dedicated button on the keypad, a menu entry or other suitable manner to select the function.

The POS terminal displays a "Display Drop Amount entry screen with Bill Validator Button," which includes a field for the cashier to enter the amount of the drop and various options for designating the tender type (e.g., bill validator, manual). The cashier designates the amount of the drop and selects the bill validator button.

The next several steps entail communication between the POS terminal and the safe, via their respective communication devices, to verify the appropriateness of the function/operation, that the individual using the POS terminal is properly authorized, and for other security purposes. Optionally, the cashier is prompted to enter certain verification information (e.g., login name and password) into the POS terminal. After such verification, the POS terminal requests the safe to initiate a bill validator drop function. However, if the verification fails, such as a bad login, the POS terminal displays an error message and the drop transaction is terminated.

Upon a successful verification, the safe accepts the bill validator drop request and, in turn, transmits a Drop ID to the POS terminal for reference purposes. The Drop ID is utilized by both the POS terminal and the safe to identify the particular drop being carried out (e.g., to distinguish this drop from other drops that occur at other times). The Drop ID is associated with all relevant information, including the purpose of the drop, the date and time of the drop, the identity of the cashier, the identity of the POS terminal employed, the amount of the drop, the particular denominations of currency of the drop, etc.

The POS terminal provides a message, via display 42, to the cashier that instructs the cashier to go to the safe (in the event the safe is not disposed in the immediate vicinity of the cashier) and to begin inserting bills (i.e., currency) into the safe via the safe's currency acceptor 24. If the safe includes a display, the cashier's name or ID optionally may be displayed.

The cashier proceeds to insert bills within the safe's currency acceptor 24. As each bill is inserted, the currency acceptor identifies the denomination of the inserted bill and verifies the bill's authenticity in manners well known in the art. If the bill is deemed authentic, the bill is transferred into the safe's internal currency cassette.

While the cashier is inserting bills, the POS terminal continuously checks the status of activity of the safe. That is, the POS terminal periodically queries the safe for the status of the drop activity. In particular, the POS terminal transmits to the safe a query safe command along with the Drop ID to request the status of the particular drop currently in process. The safe, in turn, replies with the current status of the drop, which may include: "Invalid", "Active", "Stopping", and "Complete." An invalid status designates that the Drop ID does not specify a valid drop and an appropriate indicator is displayed on the POS terminal. An active status designates that the drop session specified by the Drop Id is still active and, in such case, the POS terminal continues to check the status. A stopping status designates that the drop session is currently being stopped. A complete status designates that the drop session is complete and totals are available. The POS terminal continues to query the safe until it receives the complete status.

After insertion of the last bill, the cashier designates that the drop is complete. Such designation, in one version, is carried out by inputting an appropriate instruction on an input device of the safe (e.g., depressing a dedicated key). In another version, the cashier inputs an appropriate instruction on the POS terminal (such as when the safe does not have any keypad terminal). Upon such designation that the drop is complete by the cashier, the status of the drop is changed from active to stopping, and finally to complete. The POS terminal, upon receiving the complete status from the safe, transmits to the safe a request to get the drop total (i.e., total amount of the drop). The safe, in turn, transmits the drop total to the POS terminal.

Commercial Transaction by Customer

In accordance with the present invention, a customer of a merchant has to pay for goods and/or services provided by that merchant, and the merchant employs the system 10 of the present invention to implement the transaction. During a transaction, generally a commercial transaction, the merchant accepts a form of payment from a customer in exchange for the product(s) or service(s) desired by the customer. The form of payment may be via a credit card, a debit card, cash, check or other financial arrangement.

As indicated above, if a customer desires to use a credit card or a debit card, the merchant processes the transaction using POS terminal 40 in the ordinary manner. That is, the merchant swipes the credit or debit card through card reader 46, the merchant enters the amount of the transaction using keypad 44 and POS terminal 40 proceeds with the financial transaction by communication, generally wirelessly, with a financial network, whereby the transaction is either approved or denied. POS terminal 40 may include an integrated printer (e.g., printer 56) for printing of a receipt or, alternatively, communicate with electronic safe 20, which then prints a receipt using a printer integrated within or coupled to or in wireless communication with safe 20. FIG. 6 shows a POS terminal having an integrated printer for printing a paper receipt 58.

When a customer desires to pay by cash, the above-described process (shown in FIG. 8) is carried out in accordance with the present invention. It is noted that the safe may include a coin deposit for receiving coins, identifying the value of each coin, and verifying the authenticity of each coin. The accepted coins also are deposited within a suitable, secure receptacle within the safe. Moreover, the safe may include or be in communication with a coin dispensing system that suitably provides change when necessary. Since the construction and operation of a suitable coin deposit and coin dispensing system are well known in the art, descriptions thereof are not provided herein.

After the above-described cash drop is complete, and verification that there has been sufficient payment for the transaction (i.e., a sufficient amount of cash (and coins) have been deposited into the safe to cover the cost of the goods being purchased), the POS terminal completes the financial transaction and prints a receipt (e.g., receipt 58 shown in FIG. 6).

In one version, a separate system identifies each product or service being purchased (or rented) by the customer and that separate system communicates with POS terminal 40 and/or electronic safe 20 the total monetary amount of the transaction, or the monetary cost of each item, along with, optionally, an identification of each item being purchased. Such a separate system may be a well-known POS device that is capable of identifying an item being purchased (or rented) using, for example, a bar code scanner. For convenience, purchase or renting is hereinafter collectively referred to as a purchase. Also, for convenience, both product and service are hereinafter collectively referred to as a product.

In another version of the present invention, POS terminal 40 includes capability for identifying each item being purchased. For example, POS terminal 40 includes a bar code scanner for identifying the product being purchased. In such version, the merchant uses POS terminal 40 for "scanning" in each item being purchased by the customer. Using a look-up table or by any other known manner, the POS terminal ascertains the cost of each item that is being purchased by the customer. Then, upon completion of scanning in of all items being purchased, display 42 of POS terminal 40 displays the total amount of the transaction. The customer can use a credit or debit card, as discussed above, or the customer may desire to pay with cash or with a check. If the customer desires to pay with cash, the customer provides a sufficient amount of cash to the merchant and the merchant feeds the cash into the safe in the manner previously discussed. Upon completion of the transaction, a receipt is printed that identifies the total amount of the transaction and, preferably, an identification of each item that has been purchased.

Stopping a Bill Validator Drop from POS

Figure 9:
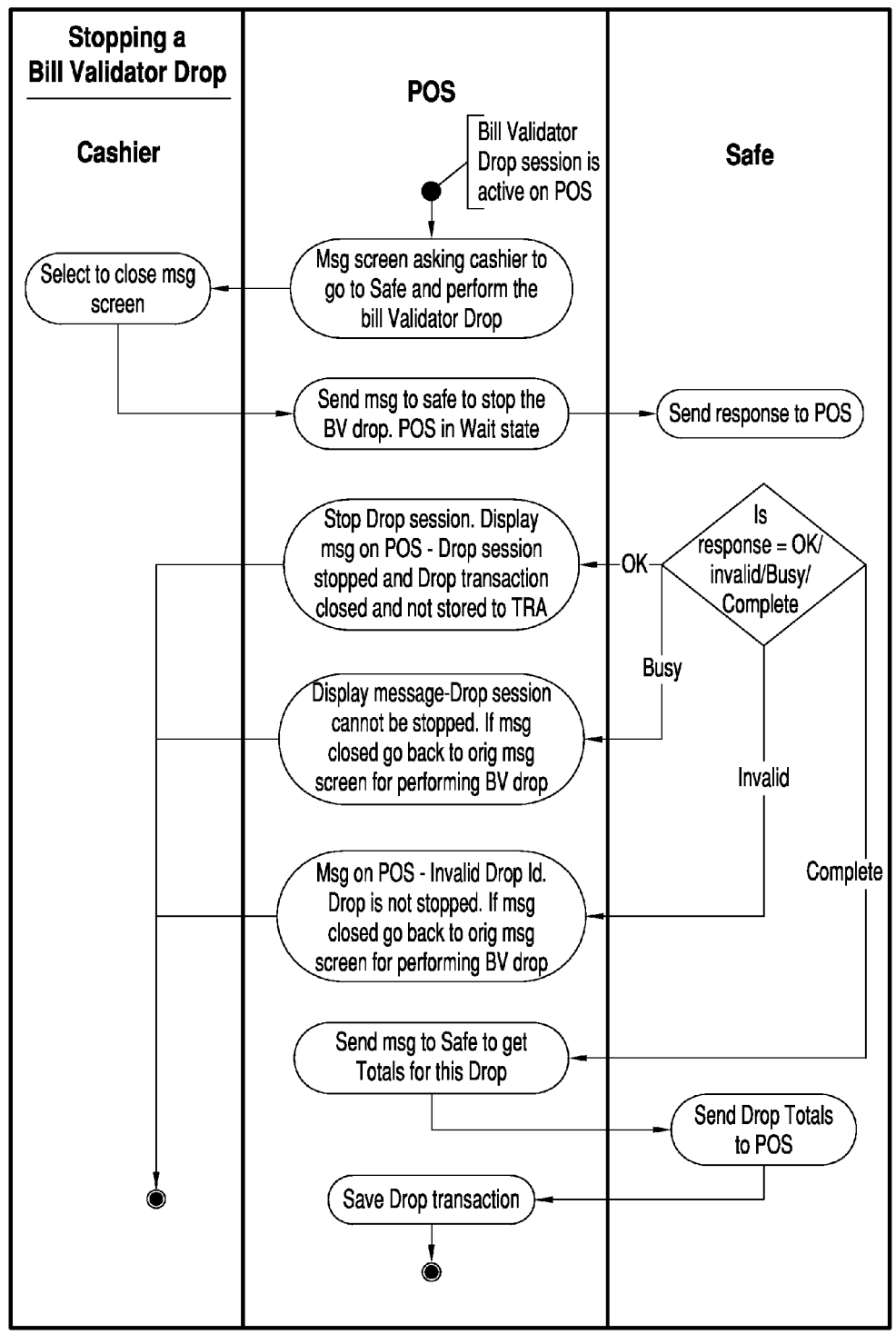
FIG. 9 is a schematic illustration of the stopping a bill validator drop function of the present invention.

FIG. 9 is a schematic flow diagram of the stopping a bill validator drop function that is carried out by the system of the present invention. As discussed above, the Bill Validator Drop function is initiated by the POS terminal and the drop session is initiated with the safe. Also as discussed above, the POS terminal displays a message for the cashier to go to the safe and start inserting bills. However, rather than inserting bills or at any point while entering bills, the cashier is able to select a "Close" function on the POS terminal, at which point the POS terminal instructs the safe to abort (i.e., stop) the drop session.

The safe responds to the POS terminal's request to abort based upon its current status, as follows. If the safe is not busy (discussed below), it stops the drop session and responds to the POS terminal that the drop has successfully stopped. The POS terminal, in turn, discontinues the bill validator drop function and displays a message to the cashier that the drop has been stopped. If, however, the safe is currently in the process of accepting bills, the safe transmits to the POS terminal a "busy" response, and the POS terminal, in turn, displays to the cashier a message that indicates that the drop cannot be stopped and the drop function continues. If the Drop ID transmitted by the POS terminal does not correspond to the Drop ID of the drop currently in process by the safe, then the safe transmits to the POS terminal an "invalid" response, and the drop function continues. The safe also may send a "complete" reply if the drop has been fully completed and, in response, the POS terminal transmits to the safe a request for the drop totals. The safe accordingly responds with the total amount of the drop.

Manual Drop for Cash or Check Tenders

Figure 10:
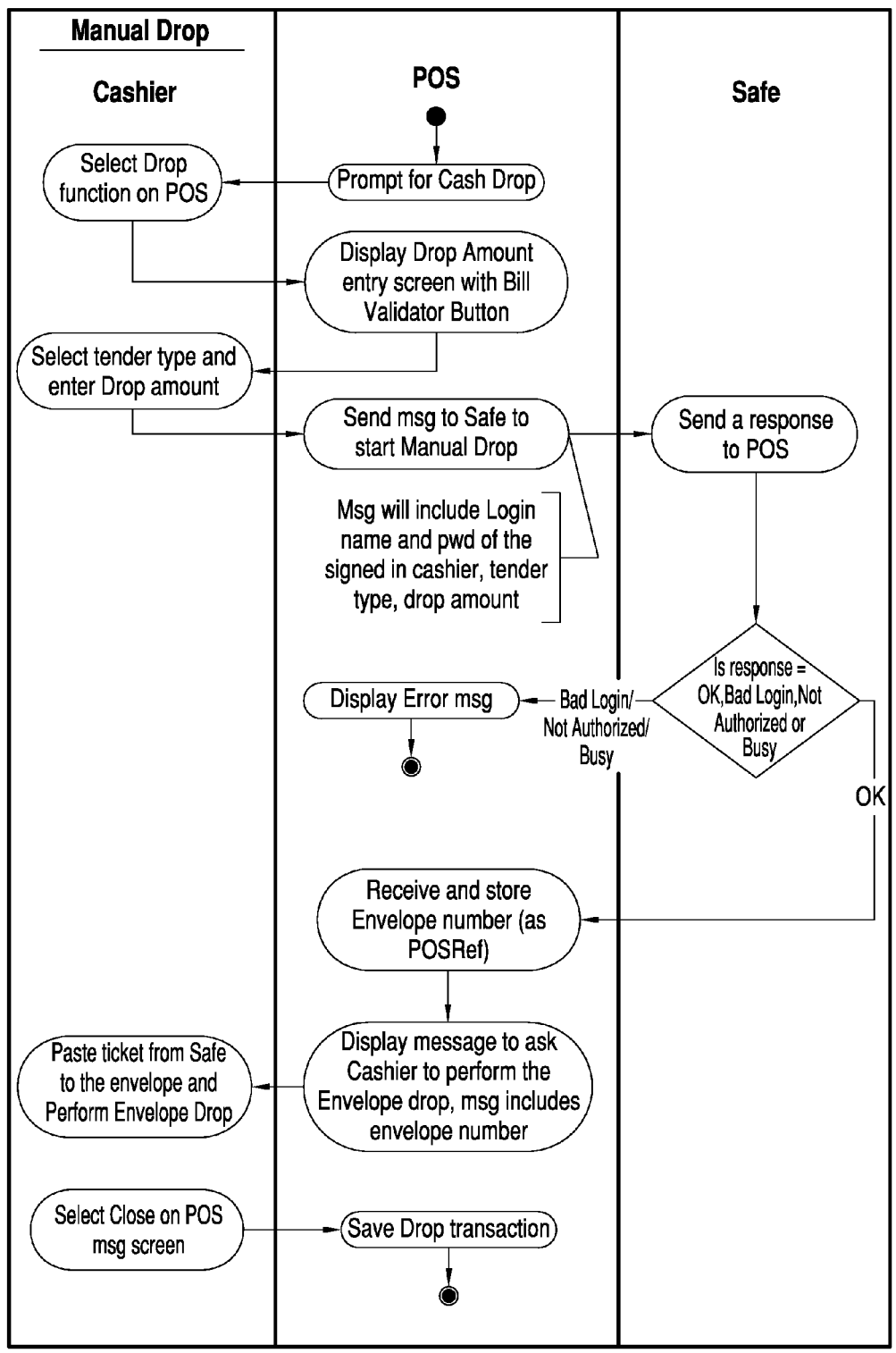
FIG. 10 is a schematic illustration of the manual drop function of the present invention.

FIG. 10 is a schematic flow diagram of the manual (envelope) drop for cash or check tenders function that is carried out by the system of the present invention. Initially, and similar to the initial steps in the process described in connection with FIG. 8 (bill validator drop), the POS terminal prompts the cashier for a cash (which includes checks) drop, the cashier selects the drop function on the POS terminal, and the POS terminal then displays the "Display Drop Amount entry screen with Bill Validator Button."

For a manual drop, the cashier enters the drop amount and selects the tender type (cash or check) (i.e., not the bill validator function described above). The cashier may enter more than one drop amount, but all of the drops preferably should be of the same tender type. The POS terminal transmits to the safe a request for a manual drop of the designated drop amount. The request further includes various verification information, such as described above in connection with the bill validator drop. Optionally, the safe will not allow manual drops that exceed a predetermined amount. Upon the safe accepting the drop request and transmitting an appropriate response to the POS terminal, the safe transmits an envelope number to the POS terminal. The POS terminal or, optionally, the safe, prints a ticket that contains the envelope number. The POS terminal then displays an instruction to the cashier to perform the manual drop. The cashier pastes the printed ticket on the envelope, inserts cash or a check within the envelope, and then inserts the envelope within the appropriate receptacle of the safe. After such manual drop, the cashier designates that the drop is complete on the POS terminal, which in turn completes the drop transaction. The safe, as well as the POS terminal, stores the amount of the drop, the envelope number, the contents of the envelope, the date/time of the transaction, the ID of the cashier, and other relevant information. The envelope number is used as the POS reference number. Optionally, a separate Drop ID may be created and associated with the transaction.

Payment by Check

In a consumer purchase transaction, as discussed above, the customer may desire to pay with a check (assuming the merchant accepts payment by check). In accordance with the present invention, the safe may include a check imager 34 (FIG. 7). As a variation, a separate check imager is associated with and in electronic communication with the safe (e.g., a separate check imager is disposed on the safe and in communication with the safe).

During the transaction, the customer provides to the cashier a check in the amount of the transaction. The above-described process shown in FIG. 8 is employed, except the cashier designates an appropriate check/scan drop function within the POS terminal. Upon the above-described communications between the POS terminal and the safe, the POS terminal instructs the cashier to insert the check into the check imager (e.g., check scanner 34 within the safe—FIG. 7). The check scanner images (i.e., "scans") the front of the check to produce an image file and appropriately deposits the scanned checked within a secure receptacle of the safe. As a variation, both sides of the check are imaged. The cashier designates on the POS terminal that the check/scan drop is complete, at which point the POS terminal completes the transaction wherein the data that is saved with the created Drop ID (used as a reference number for the transaction) includes the image file that represents an image of the check.

In a variation, the processor of the safe (or a processor of a separate check imager) has the capability to capture from the scanned check image various information on the check including, for example, the payee, check number, date, amount of currency, and routing/account number. The captured data is stored within the safe in association with the reference number of the transaction.

Upon completion of the transaction, the POS terminal prints a receipt. Optionally, the safe transmits to the POS terminal the scanned image of the check and the POS terminal prints a receipt that contains an image of the scanned check.

As used herein, the term "check" (spelled "cheque" in various countries) refers to the common understanding of what a check is. More formally, a check is a negotiable instrument that authorizes a financial institution, such as a bank, to transfer to a specified entity a designated amount of money from an account held at that financial institution. There are different types of checks. The most common type of check is an "order" check, which is payable only to the named payee. Other types of checks (or sub-types of order checks) include a bearer check (e.g., made payable to "bearer" or "cash"), a bank check, a certified check, a traveller's check, a money order, a postal order, etc. As provided herein, a "check" may be any of these types of negotiable instruments.

End of Day—Change Business Day on Safe

Figure 11:
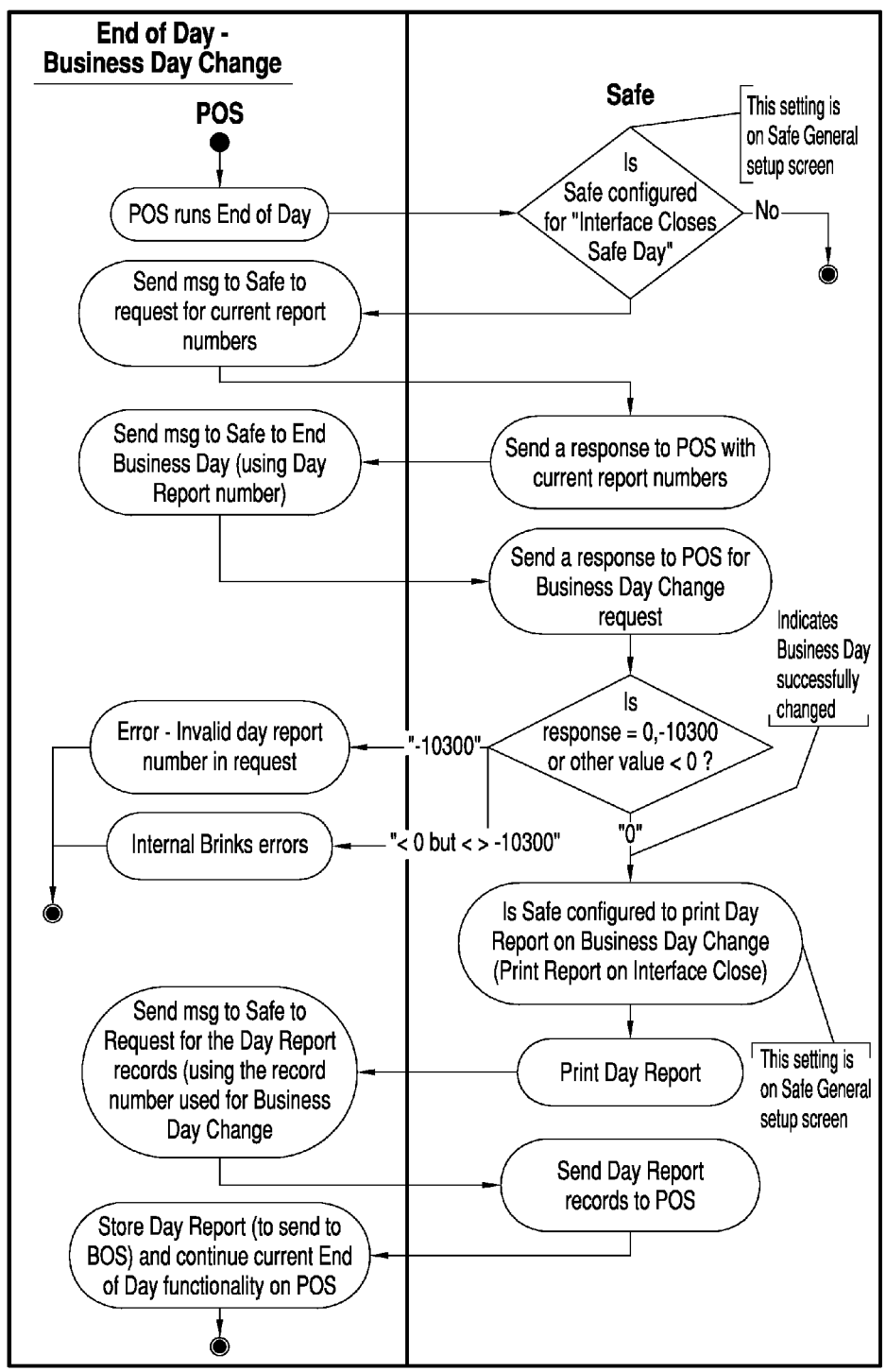
FIG. 11 is a schematic illustration of the end of day—business day change function of the present invention.

FIG. 11 is a schematic flow diagram of the End of Day—Business Day Change function that is carried out by the system of the present invention. The POS terminal automatically, as pre-programmed (or, optionally, after a manual user instruction), initiates the "End of Day" process. At initiation, the POS terminal transmits an end-of-day instruction to the safe. If the safe is configured to allow the POS terminal to change its business day (i.e. the "Interface Closes Safe Day" is selected on the safe's general setup), the POS terminal begins the process to change the business day on the safe. The POS terminal requests the current report numbers from the safe and requests the safe to end the business day. The POS terminal request includes a current Day Report Number that was previously received from the safe. If the safe's response to the business day change request is a predetermined number, such as −10300, then an invalid day report number was used in the business day change request, the POS terminal displays an error message to the user, and the business day is not changed on the safe. Also, if the response is another number or set of numbers, such as smaller than 0, then there is an internal error and the business day is not changed on the safe.

If the safe responds to the Business Day Change request with a predetermined success number, such as 0, the safe has successfully performed an end of day operation. The safe, if pre-configured, automatically (or manually instructed), prints a day report on the end of business day (e.g., if the field "Print Report on Interface Close" is selected on the safe's General Set Up screen). The POS terminal transmits to the safe a request for the day report records and, in response, the safe transmits the day report records to the POS terminal. The POS terminal stores the transmitted day report, and proceeds with any existing end of day functionality.

Print Current Safe Reports on POS—Cashier Detail, Regular Shift, Day Report

Figure 12:
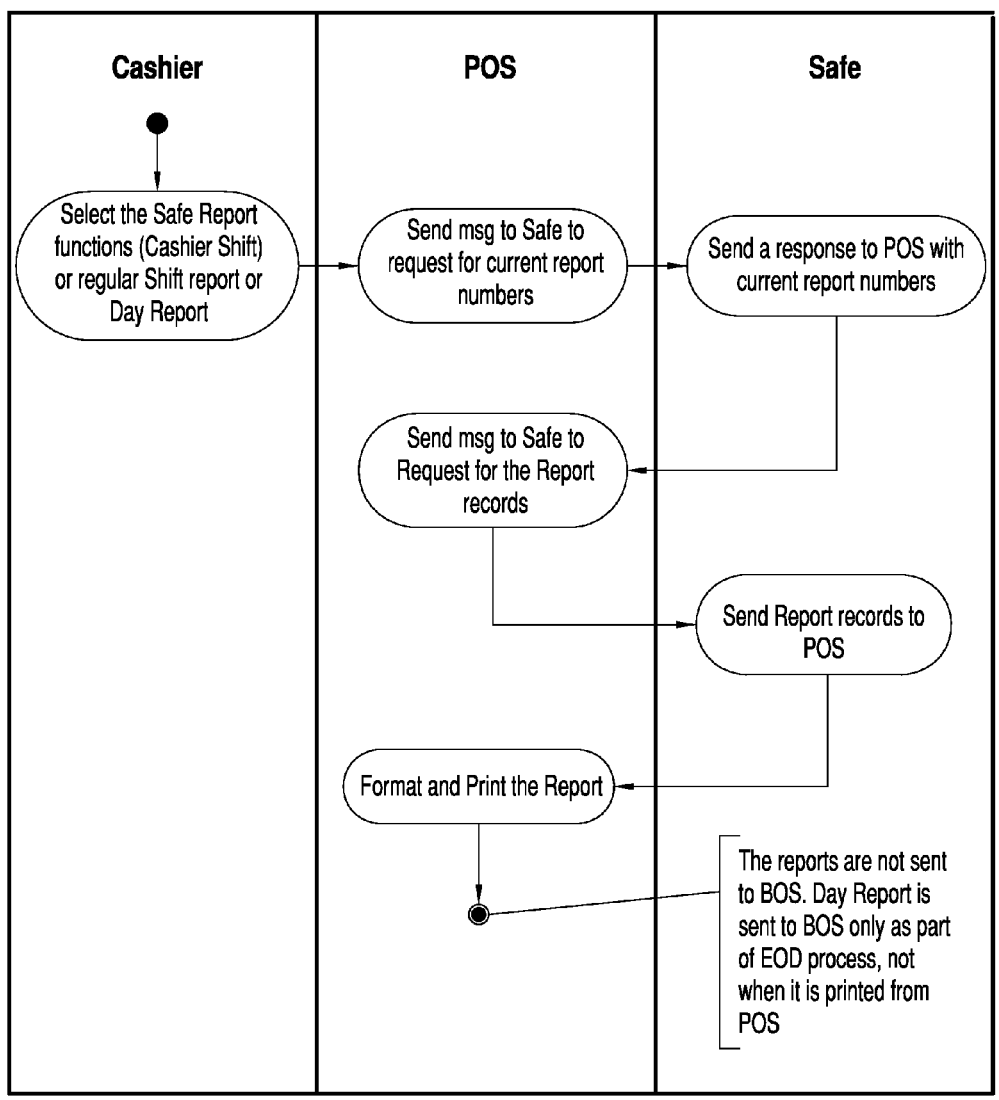
FIG. 12 is a schematic illustration other functions of the present invention.

FIG. 12 is a schematic flow diagram of various other functions that are carried out by the system of the present invention. Such other functions include printing cashier detail, regular shift and day reports from the safe. In particular, the cashier selects any these functions, the POS terminal in turn requests the current report numbers from the safe. The POS terminal then requests the selected report records from the safe for the corresponding current report number, and the POS terminal formats and prints the received report.

During or at the completion of each transaction/function, including a customer transaction wherein payment is made by any number of manners, such as by check, cash, credit card, debit card, etc., the details of each transaction are stored in the safe's memory. Such stored records may be printed by the POS terminal, such as in the manner described above in connection with FIG. 12. Other reports that may be printed or otherwise created by the safe include deposit reports that identify the amounts of cash and/or checks that have been deposited into the safe over a period of time. The safe preferably has business day reporting capability, such as described in the aforementioned patents.

In accordance with the present invention, the safe includes various components including at least one currency acceptor, a processor and associated memory, a communication device, as well as at least one internally disposed secure cassette for storing the accepted cash, along with (optionally) a check imager and a coin dispenser. However, due to the incorporation within the system of the present invention of a POS terminal having an input keypad and a display, along with a card reader, internal processor and communication device, the electronic safe can be, in accordance with the present invention, employed without the inclusion of a keypad or keyboard or a display since, as described herein, the electronic safe and the POS terminal cooperate together during the transaction.

Accordingly, the present invention entails a system that includes an electronic safe without a keypad and without a display, and a POS terminal that communicate with one another during various activities and functions, as described above, including a transaction to purchase goods/services by a customer at a retailer location. Such a system beneficially can be produced at substantially lower cost than systems that utilize an electronic safe that includes its own number/character input system (e.g., keypad) and display system. Moreover, retailers are highly familiar with traditional POS systems and thus the POS system that is employed within the system of the present invention can be utilized by merchants without any significant amount of training. Still further, off-the-shelf type POS terminals may be employed within the system of the present invention by incorporating specialized programming thereof to implement the processes described herein but without the need to modify the hardware of such off-the-shelf type POS terminals.

Bill Payment Function

In accordance with the present invention, the system of the present invention can be employed to enable a merchant to process other types of transactions that differ from those described above. Such other types of transactions include the payment of a bill, such as a utility bill or a credit card bill, by an individual or other entity (e.g., a business). Another type of transaction that also can be carried out by the system of the present invention includes payment of a monthly rental fee, a mortgage payment or other similar type payment.

When an individual, such as a customer of a retailer, desires to pay a utility bill (e.g., an electric bill), the individual (for convenience, the customer) goes to a merchant who employs the system of the present invention. The customer provides the utility bill to the merchant (e.g., a cashier at the merchant) who enters into the POS terminal an instruction to carry out a bill payment transaction. In accordance with the present invention, the POS terminal is programmed to receive such an instruction and, optionally, may be programmed so that depression of a particular key on the POS terminal's keypad designates a bill payment transaction. The POS terminal instructs the cashier to enter a code or, optionally, a name that identifies the entity to be paid (also called vendor herein). Such a code preferably is printed on the bill so that the code may be quickly ascertained. Optionally, the cashier may look-up the code from a book or on a computer. The cashier enters the code using the POS terminal's keypad. In a variation, a bar code or other type of data indicator that uniquely identifies the vendor to be paid is printed on the bill and such bar code (or other type of data indicator) is read using a suitable reader within the POS terminal (e.g., bar code scanner 58—FIG. 7). In yet another variation, the bill is similar in size to a check and the cashier feeds the bill into the check imager of the safe, and information sufficient to identify the vendor is read from the scanned image. The bill may be kept by the safe (e.g., stored within a receptacle within the safe) or, optionally, ejected back to the cashier.

The POS terminal then instructs the cashier to enter the amount of the payment and the process proceeds in a manner similar to any of the above-described processes, as applicable, such as the bill validator drop function shown in FIG. 8 or the manual drop function shown in FIG. 10. For example, if the customer desires to pay by cash, then the process shown in FIG. 8 is implemented, wherein such cash is fed into the safe's currency acceptor. If the customer desires to pay by a check, then a manual drop function as shown in FIG. 10 may be implemented or, alternatively, the check is imaged as described above. Payment may be made in other ways depending on the rules/requirements of that particular merchant and/or the particular vendor being paid. In particular, if acceptable, payment may be made via a credit or debit card. Such rules can be ascertained, if applicable, via information provided in a look-up table (e.g., in a book or using a computer).

At the completion of the bill payment transaction, the POS terminal prints a receipt with all relevant information printed thereon and the cashier provides the printed receipt to the customer. The printed receipt confirms the merchant's receipt of payment for the utility bill. If the bill had been scanned in, then the printed receipt preferably includes a copy of the bill. Similarly, if the customer paid the bill using a check, then the printed receipt preferably includes a copy of the scanned check. Hence, the customer is provided with a complete record of the bill and the manner of payment.

After a customer has paid a bill to a merchant in the manner described herein, payment from the merchant to the vendor (e.g., utility company) may be carried out in various manners. In accordance with one version of the present invention, payment is made by the merchant to each vendor at the close of the merchant's business day by commencing an electronic communication from either the POS terminal or the safe to a third party processing entity that, in turn, carries out the payment to each vendor. Alternatively, payment is made at a different time of day, such as the completion of each respective payment by a customer.

In each version mentioned herein, the safe maintains in its memory records of each payment transaction. Using the version where payment is made by the merchant at the close of the merchant's business day, as an example, and for those transactions in which customers paid bills by cash or check, electronic safe 20 creates a data file that contains the stored payment records, including for each record, the customer identity, the vendor to be paid, the amount to pay that vendor and, optionally as needed, other information such as an identification of the particular bill to be paid. The created data file is transmitted by the safe or, in a variation, the POS terminal, to a third party processing entity, such as the process facilitator disclosed in U.S. Published Patent Application No. US2009/0006249 or as disclosed in U.S. Published Patent Application No. US2009/0222381, which are assigned to the assignee of the present application and which are incorporated herein by reference.

The third party process facilitator (which may be a part of the merchant or a separate entity) includes a suitably programmed computing system (or systems) that receives the electronically transmitted data file. Transmission may occur in any known manner, such as via the Internet, telephone system, a private communications network or other suitable manner. Preferably, transmissions are encrypted to ensure proper security and privacy. Since electronic data transmission and encryption, as well as the hardware/software that are capable to carry out such transmission and encryption, are well known, further description thereof is omitted herein except where necessary for an understanding of the present invention.

The third party process facilitator "advances" a credit to the merchant based upon the funds that have been collected by the merchant (e.g., in check and cash form) and deposited into the safe at the merchant location as reported in the transmitted data file, and arranges for the payment to each identified vendor in the amounts indicated in the records in the names of the customers as also indicated in the transmitted information. Payment by the third party process facilitator may be made via an electronic wire transfer or, if necessary, via a non-electronic manner (e.g., sending a printed check of the third party process facilitator to the vender) or other known manner.

At appropriate times, such as each day or as needed, the cash and checks deposited into the safe at the merchant location are picked up, preferably by an armored car company that securely transfers the collected cash and checks to a proper cash processing facility. A portion of the funds collected by the merchant represent payments to vendors and the remaining funds that have been collected represent funds of the merchant. The cash processing facility makes proper arrangement to deposit funds of the merchant into the appropriate account(s) (e.g., bank account) of the merchant. In a variation, the cash processing facility or the above-mentioned third party process facilitator (which may be the same or different entities) provides an advance credit to the merchant for funds that have been collected by the merchant (i.e., funds collected for purchase transactions). A detailed description of providing advance credit to a merchant for funds that still reside in the safes at the merchant locations and variations thereof are set forth in U.S. Patent Application Publication No. US2009/0006249 and U.S. Published Patent Application No. US2009/0222381, which are assigned to the assignee of the present application and incorporated herein by reference.

In accordance with the present invention, a third party processing facility makes arrangements for the payment to vendors in amounts that correspond to funds that have been received by a merchant for such payment and also makes arrangements for advance credit to that merchant for the other funds that have been collected by the merchant for goods/services sold by that merchant. In addition, in different variations of the present invention, payment to vendors and/or crediting of funds to the merchant can be made at different times, such as multiple times during the course of each business day or once per business day or at the close of business if different from the merchant's business day. As another example, payment by the third party processing facility to a vendor may be made immediately upon completion of a particular payment transaction by a customer. Accordingly, electronic data files transmitted by the system of the present invention to the third party processing facility may be carried out once or multiple times per day.

The herein-described inventive system and process beneficially are well suited for large-scale merchants having many locations. In accordance with the present invention, merchants at different locations (that are part of the same company) receive and collect cash and checks for both purchase transactions and vendor payment transactions. Accordingly, safes at different locations accumulate cash and checks over, for example, a 24-hour time period. The above-described data file is transmitted by the system of the present invention from each respective location to a process facilitator that, in turn, processes the multiple data files. The process facilitator arranges for payment to each identified vendor in an amount as indicated in the records of the multiple data files that have been received. For a large-scale merchant with dozens or perhaps hundreds of locations, it is likely that the same vendor (e.g., a utility company) will need to be paid for multiple customers and the process described herein enables for a single payment (e.g., on a daily basis) by the process facilitator in an amount corresponding to the aggregate of all payments to be made to that particular vendor. In addition to such payment to that vendor, identification of all customers and respective amounts of payment per customer are transmitted to that vendor so that the customer accounts can be properly credited with the respective payments made. Thus, instead of a large vendor receiving possibly hundreds of individual payments (e.g., in a day or week), that large vendor beneficially may receive only a few "large" payments from the process facilitator if the system and process of the present invention are employed.

In addition to the foregoing described benefits, vendors can be provided with historical and statistical information that is gathered by the electronic safes of the present invention, since the safes gather and store information concerning vendors paid, dates of payments, amounts of payment, and for merchants with multiple locations, locations of payment.

As the foregoing-description sets forth, by advancing funds for payment of bills to vendors, merchants are able to collect funds from customers for bill payment and then quickly, perhaps immediately, attend to direct payment to a particular vendor in an amount that corresponds to funds that still reside at the merchant location. Accordingly, customers are credited with bill payment immediately and without the delay that is caused by mailing checks to vendors and other manners of payment. Moreover, customers need not go to the location of the vendor to immediately make payment, but rather are provided the ability to make a payment to nearly any vendor by going to a merchant who is employing the system of the present invention. Merchants benefit by enabling the quick handling of bill payment transactions thereby acquiring the good will of customers who will tend to also shop at those same merchants.

Moreover, the present invention entails a customer simultaneously making a purchase at a merchant location and making a bill payment, wherein the customer simply is able to go up to a merchant (e.g., cashier) with the goods to be purchased and with one or more bills to be paid, and the merchant is able to quickly and conveniently scan in the items to be purchased, scan in or otherwise enter each bill to be paid, and then identifies to the customer a single total amount to be paid by the customer. The customer, in turn, provides a single payment to the merchant, and then the system processes both the purchase and bill payment transactions together in any of the applicable above-described processes. A single or multiple records are created and stored within electronic safe 20 that reflect the multiple transactions and then payment may be made to each vendor in the manner herein described. Accordingly, bill payment becomes quick and efficient for the customer, for the merchant, and for the vendor.

Still further, the system of the present invention enables a customer to make a deposit of funds into his/her bank account (or account at a non-bank entity) wherein the customer identifies the account information to the merchant and the merchant enters the account information in a manner similar to that of identifying a merchant to be paid. The customer likewise can make a deposit into another person's account, such as a relative's account.

The customer can provide the merchant with a deposit slip that includes the bank (or other entity) and account information data and such deposit slip can be imaged by, for example, the check imager of the safe or, if applicable, the barcode scanner on the POS terminal. In a variation, the customer can simply hold up a bank card that contains a suitable marking that can be read by a suitable reader of the POS terminal. Other manners of identifying the bank (or other entity) and account number of the customer can be employed. Then, depositing of funds into that account is carried out by employing the same process described herein with respect to payment of a bill.

Appendix A below is a user's guide in connection with the CompuSafe® safe XML interface and is provided as a technical guide to further assist in the development of a computer interface to the CompuSafe® safe XML Interface.

Accordingly, the system of the present invention comprises an electronic safe and a POS terminal that collectively carry out various transactions including consumer transactions in which customers purchase goods and/or services from a retailer, and to enable individuals to make payments and to make deposits in manners that provide various significant benefits to the customers, to the merchants, and to the vendors.

Having described the present invention including various features and variations thereof, it is intended that the appended claims be interpreted as including the embodiments described herein, the alternatives mentioned above, and all equivalents thereto.

APPENDIX A

CompuSafe® Safe XML Interface User's Guide

1 Network Communications 1.1 Document Conventions
This document is intended as a technical guide for those whose task is to develop a computer interface to the CompuSafe® safe XML Interface. Accordingly, it is necessarily detailed. As an aid to every reader's comprehension. XML statement formats and examples are freely included within the descriptive text. Such intermingling of descriptive prose with mandatory formats and related examples can be confusing unless it is obvious which is which. To avoid such confusion, this guide uses the typographical conventions listed in Table 1.1-1.

TABLE 1.1-1

Special, typographical conventions are used to enhance clarity.

| CONVENTION | DESCRIPTION |
| --- | --- |
| <Network rxTimeout='4'/> | XML statements (both formats and examples) are shown using Courier font. |
| rxTimeout='*no_seconds*' | *Italicized* words are placeholders for values, names, etc. a user must provide. Here, the placeholder *no_seconds* must be replaced by the actual number of seconds. A column or row of three dots indicates that part of the example has been omitted intentionally. |

TABLE 1.1-1-continued

Special, typographical conventions are used to enhance clarity.

| CONVENTION | DESCRIPTION |
| --- | --- |
| id='number' | Boldface words are placeholders for values, names, etc. which the XML Interface will place in response messages. |
| hh:mm:ss, DDD, dd MMM yyyy | Time. Time strings are either 25 or 26 characters, depending upon whether or not the date of the month is 1 character or 2. For example: 14:47:55, Fri, 4 Nov 2005 - or - 14:47:55, Fri, 18 Nov 2005 |

In addition to the conventions listed in Table 1.1-1, where multiple XML statements occur as a set, this document lists one XML statement per line, with sub-statements indented. The use of these line feeds and indenture is done only for visual clarity. As with any XML statement, such separation of statements is not required.

1.2 Functional Description
Network communications refers to any communications between the configurable socket on the Ethernet port and the CompuSafe® safe. This is a client-server configuration, with the CompuSafe® safe in the role of the server.

A communications session begins with receipt of a XML request/command by the network handler from the attached user, using the TCP/IP communications protocol. After assembling the entire packet, the CompuSafe® safe starts processing the packet.

Assuming a valid request is made, the CompuSafe® safe will responds with a single or multi-node XML message, as appropriate. When the CompuSafe® safe completes delivery of the message via the Ethernet port, the communications session closes, and the system resets in preparation for the next task.

Occasionally, errors can interrupt this communications process. If that occurs, one of two things normally follows: The XML Interface prepares and sends an "error" response to the client or else the response message itself contains an error code. Section 2.3 addresses these abnormal responses.

1.3 Confirming/Maintaining Network Connection (Pinging)
Pinging is a simple means of confirming that the connection between the CompuSafe® safe's Ethernet port and a device attached to it is intact. The network handler responds to two types of pings: an empty ping and a non-empty ping. The former merely confirms the connection; the latter commands monitoring action of the network handler.

1.3.1 Empty Ping
An empty ping is a simple command from the network, which the network handler merely reflects. It has the XML format:

```
<?xml version='1.0'?>
<Network>
    <Ping/>
</Network>
```

The attached device may use an empty ping at random intervals to check connectivity. A second, and quite different use of an empty ping is to disable a non-empty ping command, which is described next.

1.3.2 Non-Empty Ping
The network device uses a non-empty ping to enable the network handler's own, connectivity-monitoring feature. This command has the format:

```
<?xml version='1.0'?>
<Network>
    <Ping>no_seconds</Ping/>    where 1 <= no_seconds <= 10
</Network>
```

For instance, the XML command

```
<?xml version='1.0'?>
<Network>
    <Ping>5</Ping/>
</Network>
``` instructs the network handler to expect to hear from the network at least every five seconds.

Once this feature is enabled, the network handler expects to receive something from the network at intervals which do not exceed 'no_seconds' seconds. If the network handler receives nothing from the attached device within this period, it assumes that the current connection has been lost and closes the connection. The CompuSafe® safe then changes it's state to expect a new connection to be established.

In normal use, an attached device typically would repeat the same non-empty ping command to the CompuSafe® safe at slightly under 'no_seconds' second intervals whenever the connection is otherwise idle. The advantage of doing this is that, if the application ever exits without explicitly closing the connection—which could happen if the attached computer locks up—the network handler can reset the CompuSafe® safe such that it is ready to accept a new connection when the application resumes.

2 CompuSafe® Safe Protocol

2.1 XML Requests & Single-Packet Responses

Communications with the CompuSafe® safe at the Ethernet port conforms to the XML version 1.0 standard. As is typical of any client-server arrangement, a device attached to this port sends a XML request/command and receives a XML reply. Sections 2.3 & 2.4 describe these message exchanges in detail. All such requests have the same basic format (and see section 1.1 regarding line feeds and indenture)

```
<?xml version='1.0'?>
<CSafe>
    <RequestNodeName>
```

Other XML statements (if any) unique to the request appear here.

```
    </RequestNodeName>
</CSafe>
```

As explained is section 1.2, the root node "<CSafe>" identifies the request to be a message to the CompuSafe® safe, and the XML manager will route both it and the response correctly. XML responses are similar in format to requests, to wit:

```
<?xml version='1.0'?>
<CSafe>
    <RequestNodeName>
```

Other XML statements unique to the response appear here.

```
    </RequestNodeName>
</CSafe>
```

Users should check the reflected "root" and "request-node" names upon receipt, both to confirm correct request-response pairing and to ensure correct processing of the data in the reply. In doing so, recognize that, where there exists the possibility of delivering an "old" or a "current" report, rather than responding with the "request-node" name alone, the response packet will identify which variant the response is, using the prefixes "Old" or "Cur", respectively. For instance, the request-node name for a day report (see section 2.4.2.3) is <Day>. The equivalent, response-node name will be either <OldDay> or <CurDay>, depending on the status of the response.

A specific example of a XML request to and response from an XML Interface is the following request for current report numbers (see section 2.4.1.2 for actual formats):

| XML Request | XML Response |
|---|---|
| `<?xml version='1.0'?>` | `<?xml version='1.0'?>` |
| `<CSafe>` | `<CSafe>` |
| `  <CurRptNo/>` | `  <CurRptNo>` |
| `</CSafe>` | `    <ContentNo>365</ContentNo>` |
| | `    <DayNo>714</DayNo>` |
| | `    <ShiftNo>2005</ShiftNo>` |
| | `  </CurRptNo>` |
| | `</CSafe>` |

Here, the XML Interface responded to the request by identifying the current report numbers in the CompuSafe® safe to be content report #365, day report #714, and shift report #2005.

2.2 XML Requests & Multi-Packet Responses

All XML requests use the request format described in section 2.1. When such a request leads to multi-packet responses, all of these responses are contained within the same root node. Each has its own response node name, which might not be unique. The format of a multi-packet response is:

```
<?xml version='1.0'?>
<CSafe>
    <RequestNodeName>
```

Other XML statements of the basic response appear here.

```
    </RequestNodeName>
    <Report2_NodeName>
```

Other XML statements of the "Report_2" response appear here.

```
    </Report2_NodeName>
    <ReportN_NodeName>
```

Other XML statements of the "Report_N" response appear here.

```
        </ReportN_NodeName>
    </CSafe>
```

2.3 Abnormal Responses from Safe

The formats and meanings of all XML requests sent to a CompuSafe® safe via a XML Interface are completely described in section 2.4. That section of this document describes normal, XML replies too. However, several abnormal replies, described in sections 2.3.1-2.3.4 are also possible. Every user attached to or using replies from the XML Interface must be able to deal properly with these abnormal situations.

2.3.1 XML Request Error

XML request errors occur when the XML Interface fails to receive the entire XML request or when that request contains a format error. The former occurs when the XML Interface receives the start of a XML packet (i.e., the '<' character), but does not receive the complete, closing statement of the root node of the request before rxTimeout occurs. Such errors usually are caused by failure of one or more of the packets inherent in the TCP/IP process to arrive at the XML port.

The XML Interface detects format errors while parsing the XML request and processing the results. Ensuring that all XML requests are correctly formatted helps avoid this problem; however, sometimes (very rarely) electromagnetic interference corrupts even well formed requests.

In both cases, the XML Interface simply waits for the end of this node until the "rxTimeout" period (see section Error! Reference source not found.) expires, then resets itself (i.e., clears its input buffer) to receive the next XML request. The attached user receives the following response to the request:

```
    <CSafe>
        <Error id='1010'>xml parse error</Error>
    </CSafe>
```

If this error occurs, resend the request. If the error persists, contact Brink's for assistance.

2.3.2 Safe Interface Error

Errors can occur during the XML communication either due to xml formatting errors or due to invalid requests. the XML interface will indicate the error in the respond to the user by returning the original request with an error statement immediately before closing the root node:

```
    <CSafe>
        <Error id='number'>description</Error>
    </CSafe>
```

Although some of these error descriptions might be meaningful to a user, both the number and description are intended as diagnostic aids for Brink's engineers. Thus, except for responding as indicated below, users may safely ignore the data in an error statement.

Should any safe interface error occur, repeat the request/command until the XML Interface accepts it, for a maximum duration of five minutes at intervals of at least 100 milliseconds and at one-second intervals for the next five minutes. [NOTE: The lengthiest delay of this type occurs while transferring a content report during a Brink's pickup, and the above action should allow ample time to complete the transfer of the content report.] If the error persists after that, contact Brink's for service.

2.3.3 Invalid Request Response [Error #256]

An invalid request response is a special type of safe interface error. It occurs when the CompuSafe® safe cannot identify the request. In response, the safe returns error number 256 to the XML Interface, resulting in a XML response message having the form:

```
    <CSafe>
        <ReqError>
            <Result>256</Result>
            <Request>request_number</Request>
            <ReportNo>0</ReportNo>
        </ReqError>
    </CSafe>
```

Response Field Definitions:

| FIELD | RANGE | DESCRIPTION |
|---|---|---|
| request_number | 1-255 | Number corresponding to the type of request. These numbers are listed as the request "record type" in the description of each request in Section Error! Reference source not found. and its subsections. |

A faulty XML request is not the source of an invalid request error. The XML request might, of course, contain a faulty request name which the XML Interface cannot recognize, leaving it unable to formulate a binary request to the safe. If this occurs, however, the XML Interface will respond to the request as described in section 2.3.1.

However, the XML-to-binary translation itself could be faulty. Thus, the source of this error most likely is within the XML Interface itself. An occasional error of this type might be due to electromagnetic interference; however, it the problem persists, contact Brink's for service.

2.3.4 Invalid Report Response [Error #257]

An invalid report error occurs when a CompuSafe® safe does not have the requested report on file. Very rarely, the cause of this response is a corrupted file within the safe. Instead, two issues are usually the source of this response:
  The report number in the request is erroneous.
  The report has been overwritten by a more recent report. [When its file space fills, a CompuSafe® safe overwrites its oldest report on file with the newest one. The safe still has many reports on file; however, the request is too late to retrieve the requested report.]

In either case, the XML Interface responds by returning an invalid report response, which has the form:

```
    <CSafe>
        <RptError>
            <Result>257</Result>
            <Request>request_number</Request>
            <ReportNo>report_number<ReportNo>
        </RptError>
    </CSafe>
```

Response Field Definitions:

| FIELD | RANGE | DESCRIPTION |
|---|---|---|
| *request_number* | 1-255 | Number corresponding to the type of request. These numbers are listed as the request "record type" in the description of each request in Section Error! Reference source not found. and its subsections. |
| *report_number* | 1-65534 | Number of the requested report. |

If this error occurs, check the validity of the requested report number. If the number is incorrect, try again with the new number, otherwise, abandon the effort, for the report is unavailable.

Note: An invalid report error occurs only in response to the basic request. If [1] that request is valid (i.e., the basic report requested is on file) and [2] the request results in a multi-packet response (e.g., a content report) and [3] one of the component reports is no longer on file, the safe will not produce this error.

2.4 Available Records

This section lists every report and record which the XML Interface can deliver to an XML user. In each case, the appropriate subsection identifies the use of the report/record and the format of the request/command and response. It also details each data item in the request (when the request contains data items) and resulting response.

2.4.1 Information Records

The four available, information records, which are listed in the subsections which follow, reveal the current operating status of the CompuSafe® safe. Information in these records provides a sound basis for preparing XML requests for other reports and records.

2.4.1.1 Safe Identification

Purpose: Identifies the safe, the software version running on the safe, and the store. This record also provides the reason and mode for which a CompuSafe® safe is set to call a programmed telephone number to deliver advanced deposit information.

[NOTE: This identification number of the safe is the one entered manually by Brink's when setting up the advance deposit feature of the safe. Normally, this is the serial number of the safe (not the electronic serial number of the electronics assembly). If the advance deposit feature has not been set up on the safe, then this identification number has the value zero. In this case, the (see below) safe_id_no, old_safe_id, and reason are invalid and should not be used; however, version, mode, and store_name are valid values whether or not the advance deposit feature has been set on the safe.]

Request Format:

```
<?xml version='1.0'?>
<CSafe>
    <SafeID/>
</CSafe>
```

Response Format:

```
<?xml version='1.0'?>
<CSafe>
    <SafeID>
        <SafeID>safe_id_no</SafeID>
        <OldSafeID>old_safe_id</OldSafeID>
        <Reason>reason</Reason>
        <Version>version</Version>
        <Mode>mode</Mode>
        <StoreName>store_name</StoreName>
    </SafeID>
</CSafe>
```

Response Field Definitions:

| FIELD | RANGE/LENGTH | DESCRIPTION |
|---|---|---|
| safe_id_no | 1-4294967295 | Current, electronic ID number of safe |
| old_safe_id | 1-4294967295 | Old Safe ID (if safe ID has been changed). [NOTE: Currently, this is the same as "safe_id_no".] |
| reason | 1-65535 | Reason for call: (NOTE: Used only for connection via modem; unused for direct connection at store) 0 - Content removal. 1 - Daily call. 2 - Forced call. 4 - End of day. 6 - Change delivery. 7 - Local connection (currently unused) |
| version | Always 8 characters | Current software version [8-character, ASCII string]. |
| mode | 1 character | Call mode: 'L' for live or 'T' for test mode. |
| store_name | 1-32 characters | Store name [32-character, ASCII string]. |

2.4.1.2 Current Report Numbers Purpose: Identifies the numbers of the current content, day, and shift (regular) reports.

XML Request Format:

```
<?xml version='1.0'?>
<CSafe>
    <CurRptNo/>
</CSafe>
```

XML Response Format:

```
<?xml version='1.0'?>
<CSafe>
    <CurRptNo>
```

```
        <ContentNo>content_rpt_no</ContentNo>
        <DayNo>day_rpt_no</DayNo>
        <ShiftNo>shift_rpt_no</ShiftNo>
      </CurRptNo>
    </CSafe>
```

Response Field Definitions:

| FIELD | RANGE | DESCRIPTION |
| --- | --- | --- |
| content_rpt_no | 1-65534 | Current content report number. |
| day_rpt_no | 1-65534 | Current day report number. |
| shift_rpt_no | 1-65534 | Current [regular] shift report number. |

2.4.1.3 Cashier Shift Range

Purpose: Identifies the range of cashier shifts for a given business day. [NOTE: This request is valid only when the safe is operating in the cashier shift mode.]

Recognize that report numbers in a CompuSafe® safe increase from 1 to 65534, then roll over to 1 and repeat. This means that calculated day report numbers ranging from −19 to 0 refer to report numbers 65515 to 65534, respectively. So, if the result of the subtraction is less than or equal to zero, add 65534 to this result to obtain the correct, initial report number. If the day report is no longer on file, expect an "invalid report" response (see section 2.3.4) to your request for the cashier shift range.

XML Request Format:

```
<?xml version='1.0'?>
<CSafe>
  <ShiftRng>
    <DayNo>day_no</DayNo>
  </ShiftRng>
</CSafe>
```

Request Field Definitions:

| FIELD | RANGE | DESCRIPTION |
| --- | --- | --- |
| day_no | 1-65534 | Number of the business day (i.e., day report number) for which the cashier shift range is needed. |

XML Response Format:

```
<?xml version='1.0'?>
<CSafe>
  <ShiftRng>
    <DayNo>day_no</DayNo>
    <FirstShft>first_shift_no</FirstShft>
    <LastShft>last_shift_no</LastShft>
  </ShiftRng>
</CSafe>
```

Response Field Definitions:

| FIELD | RANGE | DESCRIPTION |
| --- | --- | --- |
| day_no | 1-65534 | Day report number for this request. |
| first_shift_no | 1-65534 | First cashier shift report number for this business day. |
| last_shift_no | 1-65534 | Last cashier shift report number for this business day. |

2.4.2 CompuSafe® Safe Reports

The CompuSafe® safe reports described in this section are those report records which may be obtained electronically from the safe. These records are electronic equivalents of the printed reports the safe provides automatically upon completion of an accounting period or those which the store supervisor or Brink's personnel can print using the safe console.

2.4.2.1 Cashier Shift Report

Purpose: Delivers a designated cashier shift report. The safe has to be set to "User Shift Mode", otherwise this command will return an Invalid Request Response (see section 2.3.3) [NOTE: A cashier shift is one which begins when the cashier "signs on" and ends when that casher "ends" his/her shift. Only a single cashier may be active during a cashier shift, although multiple cashier shifts may overlap.]

Recommendation: Unless you know a priori the number of the specific, cashier shift report you seek, first find the cashier shift range (see section 2.4.1.3) for a designated business day. Then request each of these cashier shift reports in sequence until you reach the one you seek. When incrementing this report number, recognize that report numbers in a CompuSafe® safe increase from 1 to 65534, then roll over to 1 and repeat.

XML Request Format:

```
<?xml version='1.0'?>
<CSafe>
  <CShift>
    <CShiftNo>cashier_shift_no</CShiftNo>
  </CShift>
</CSafe>
```

Request Field Definitions:

| FIELD | RANGE | DESCRIPTION |
| --- | --- | --- |
| cashier_shift_no | 1-65534 | Number of the desired cashier shift report |

XML Response Format:

There are two possible responses to this request: one for the current shift report (which is always incomplete) and one for reports of completed, cashier shifts. They differ only on the response node name ("CurCShft" for current, cashier shift reports and "OldCShft" for completed, cashier shifts) and in the absence of an end time for current shift reports:

```
<?xml version='1.0'?>
<CSafe>
  <OldCShft>              [NOTE: <CurCShft> for current shifts.]
    <CShiftNo><report_no</CShiftNo>
    <CashID><cashier_id</CashID>
    <StartTime><shift_start_time</StartTime>
    <EndTime><shift_end_time</EndTime> [Absent in current reports.]
    <EnvCount><envelope_count</EnvCount>
    <UnrecBill><unrecog_bills</UnrecBill>
    <UCRatio><ucr</UCRatio>
    <EnvCash>env_cash_amt</EnvCash>
    <NonCash>env_noncash_amt</NonCash>
    <CassCash>cassette_cash</CassCash>
    <TotalAmt>total_amount</TotalAmt>
    <SalesAmt>sales_amount</SalesAmt>
    <ChgVend>change_vend_amt</ChgVend>
    <Payout>payout_amount</Payout>
    <Check>env_check_amt</Check>
    <FoodStamp>food_stamp_amt</FoodStamp>
  </OldCShft>         [NOTE: </CurCShft> for current shifts.]
</CSafe>
```

Response Field Definitions:

| FIELD | RANGE/LENGTH | DESCRIPTION |
|---|---|---|
| report_no | 1-65534 | Cashier shift report number |
| cashier_id | 1-65535 | Cashier Identification number |
| shift_start_time | $25^A$ or 26 char. | Starting time of the cashier shift. [Format: hh:mm:ss., DDD, $dd^A$ MMM yyyy] |
| shift_end_time[B] | $25^A$ or 26 char. | Ending time of the cashier shift. [Format: hh:mm:ss, DDD, $dd^A$ MMM yyyy] |
| envelope_count | 0-65535 | Number of envelope drops made during the shift |
| unrecog_bills | 0-65535 | Number of unrecognized bills deposited during the shift |
| ucr | 0-1000 | Unverified cash ratio (in tenths of a percent) |
| env_cash_amt | 0-2147483647 | Amount of cash (cents) dropped in envelopes |
| env_noncash_amt | 0-2147483647 | Amount of non-cash (cents) dropped in envelopes |
| cassette_cash | 0-2147483647 | Total cash (cents) deposited in the acceptors |
| total_amount | 0-2147483647 | Sum (cents) of cassette cash and envelope drops |
| sales_amount | 0-2147483647 | Total amount (cents) minus change vends (cents) |
| change_vend_amt | 0-2147483647 | Amount (cents) vended from a change safe |
| payout_amount | 0-2147483647 | Amount (cents) of payouts vended from a change safe |
| env_check_amt | 0-2147483647 | Amount (cents) of checks dropped in envelopes |
| food_stamp_amt | 0-2147483647 | Amount (cents) of food stamps dropped in envelopes |

NOTES:
[A] A leading zero does not appear for date of the month in the range 1-9.
[B] This element is absent in current reports 2.4.2.2 Content Report Purpose: Delivers a designated content report.

A content report consists of several associated reports (see section 2.2). The first of these is the content summary report. Next, are cassette summary reports, one for each cassette in the CompuSafe® safe and any attached, remote safes. Normally, there are two cassette summary reports, but there might be anywhere from none (if no acceptor is in service) to several (if a cassette has been replaced between Brink's pickups or if active, remote safes are connected to the master safe). After these are the business day and partial business day reports, followed by envelope summary reports, if any. If there are any, there will be one envelope summary report for each envelope drop made during the content period. Finally, there might be a CDU overlimit alert, which will occur only if an overlimit condition occurred during this content period. Normally, there will be only one overlimit report per period, but there could be more.

Recommendation: To confirm the validity of the content report number used as the argument in this request, ask for the current report numbers (see section 2.4.1.2) before requesting the content report. Recognize that report numbers in a CompuSafe® safe increase from 1 to 65534, then roll over to 1 and repeat. This means that calculated day report numbers ranging from −17 to 0 refer to report numbers 65518 to 65534, respectively. So, if the result of the subtraction is less than or equal to zero, add 65534 to this result to obtain the correct, initial report number.

XML Request Format:

```
<?xml version='1.0'?>
<CSafe>
 <Content>
  <ContentNo>content_rep_no</ContentNo>
 </Content>
</CSafe>
```

Request Field Definitions:

| FIELD | RANGE | DESCRIPTION |
|---|---|---|
| content_rep_no | 1-65534 | Number of the desired content report |

XML Response:

As just indicated, a request for a content report triggers the safe to send multiple packets in response. As described in section 2.2, the XML Interface will translate these into a multi-packet response, all of which are contained within the same <CSafe> root node. The general form of this reply will be:

```
<?xml version='1,0'?>
<CSafe>
 <OldCont> ... </OldCont>    [Content summary, which might
                              be <CurCont>]
 <Cassette> ... </Cassette>  [Cassette #1 report]
 <Cassette> ... </Cassette>  [Cassette #2 report]
 <OldDay> ... </OldDay>      [Partial business day report]
 <OldDay> ... </OldDay>      [Full business day report]
 <OldDay> ... </OldDay>      [Full business day report]
 <OldDay> ... </OldDay>      [Partial business day report]
 <Envelope> ... </Envelope>  [Envelope report (if any)]
 <Envelope> ... </Envelope>  [Envelope report (if any)]
 <OvrLimit> ... </OvrLimit>  [CDU overlimit report (if any)]
</CSafe>
```

In this general reply, there will be as many cassette reports as there are cassettes used during this content period and as many envelope reports as there are envelope drops during the period. There will be at least the initial partial business day report. If a single business day ended during this period, there will also be the final, partial business day report. If more than one business day ended during the period, there will be one full business day report for each complete business day which ended during the period.

This general reply format—especially in the case of quite old content reports—might be reduced by the non-availability of component reports. As explained in section 2.3.4, a CompuSafe® safe overwrites its oldest reports on file with the latest ones. As a consequence, some old cassette, day, envelope, and over-limit reports relative to a designated content report might no longer exist. Such overwriting does not trigger an "invalid report" response (see section 2.3.4), for that only applies to the basic request (in this case, the content summary report). The only way to detect such component-overwriting is to compare the contents of the components with their equivalents in the content summary.

For instance, the sum of the "envelope cash" in all of the envelope reports for the period should equal the "envelope cash" reported on the content summary report. If the two values differ, the content summary is correct, and, in this case, at least one envelope report has been overwritten.

XML Response Format (Content Summary):

There are two possible, content summary responses to this request: one for the current content report (which is always incomplete) and one for reports of completed, content periods. They differ only on the response node name ("CurCont" for current, cashier shift reports and "OldCont" for completed, content periods) and in the absence of an end time for current content reports:

```
<OldCont>                                    [NOTE: <CurCont> for current content reports.]
  <ContentNo>content_rpt_no</ContentNo>
  <StartTime>start_time</StartTime>
  <EndTime>end_time</EndTime>               [Absent in current reports.]
  <EnvCount>envelope_count</EnvCount>
  <EnvItems>envelope_items</EnvItems>
  <EnvCash>env_cash_amt</EnvCash>
  <NonCash>env_noncash_amt</NonCash>
  <EnvTotal>env_total_amt</EnvTotal>
  <CassCash>cassette_cash</CassCash>
  <TotalAmt>total_amount</TotalAmt>
  <ChgVend>change_vend_amt</ChgVend>
  <UCRatio>ucr</UCRatio>
  <FirstDay>start_day_no</FirstDay>
  <LastDay>last_day_no</LastDay>
  <DayCount>day_count</DayCount>
  <BagSeal>bag_seal_1</BagSeal>
  <BagSeal>bag_seal_2</BagSeal>
  <BagSeal>bag_seal_3</BagSeal>
  <BagSeal>bag_seal_4</BagSeal>
  <BagSeal>bag_seal_5</BagSeal>
  <BagSeal>bag_seal_6</BagSeal>
  <BagSeal>bag_seal_7</BagSeal>
  <BagSeal>bag_seal_8</BagSeal>
  <CassStat>cass_status_1</CassStat>
  <CassStat>cass_status_2</CassStat>
  <CassStat>cass_status_3</CassStat>
  <CassStat>cass_status_4</CassStat>
  <CassStat>cass_status_5</CassStat>
  <CassStat>cass_status_6</CassStat>
  <SafeEntry>entry_status</SafeEntry>
  <Payout>payout_amount</Payout>
  <Check>env_check_amt</Check>
  <FoodStamp>food_stamp_amt</FoodStamp>
  <Sequence>sequence_no</Sequence>
  <ChgFund>change_fund</ChgFund>
  <Cat2Sales>cat2_sales</Cat2Sales>
</OldCont>                                   [NOTE: </CurCont> for current content reports.]
```

Content Summary Response Field Definitions:

| FIELD | RANGE/LENGTH | DESCRIPTION |
|---|---|---|
| content_rpt_no | 1-65534 | Content report number |
| start_time | $25^A$ or 26 char. | Starting time of the content period. [Format: hh:mm:ss, DDD, $dd^A$ MMM yyyy] |
| end_time$^B$ | $25^A$ or 26 char. | Ending time of the content period. [Format: hh:mm:ss, DDD, $dd^A$ MMM yyyy] |
| envelope_count | 0-65535 | Number of envelope drops made during the period |
| envelope_items | 0-32767 | Number of items deposited via envelope drops |
| env_cash_amt | 0-2147483647 | Amount of cash (cents) dropped in envelopes |
| env_noncash_amt | 0-2147483647 | Amount of non-cash (cents) dropped in envelopes |
| env_total_amt | 0-2147483647 | Total amount (cents) dropped in envelopes |
| cassette_cash | 0-2147483647 | Total cash (cents) deposited in the acceptors |
| total_amount | 0-2147483647 | Sum (cents) of cassette cash and envelope drops |

-continued

| FIELD | RANGE/LENGTH | DESCRIPTION |
| --- | --- | --- |
| change_vend_amt | 0-2147483647 | Amount (cents) vended from a change safe |
| ucr | 0-1000 | Unverified cash ratio (in tenths of a percent) |
| start_day_no | 1-65534 | Day report number of the first day in this content period |
| last_day_no[B] | 1-65534 | Day report number of the last day in this content period |
| day_count | 1-32767 | Number of business days in the content period |
| bag_seal_1 | 0-2147483647 | Bag seal #1 used for this content removal |
| bag_seal_2 | 0-2147483647 | Bag seal #2 used for this content removal |
| bag_seal_3 | 0-2147483647 | Bag seat #3 used for this content removal |
| bag_seal_4 | 0-2147483647 | Bag seal #4 used for this content removal |
| bag_seal_5 | 0-2147483647 | Bag seal #5 used for this content removal |
| bag_seal_6 | 0-2147483647 | Bag seat #6 used for this content removal |
| bag_seal_7 | 0-2147483647 | Bag seal #7 used for this content removal |
| bag_seal_8 | 0-2147483647 | Bag seal #8 used for this content removal |
| cass_status_1 | −1-32767 | Cassette #1 status: <br> −1 = Status unknown 0 = Cassette installed <br> 1 = Cassette removed 2 = Cassette replaced <br> 5 = Cassette being replaced |
| cass_status_2 | −1-32767 | Cassette #2 status: [See meanings above.] |
| cass_status_3 | −1-32767 | Cassette #3 status: [See meanings above.] |
| cass_status_4 | −1-32767 | Cassette #4 status: [See meanings above.] |
| cass_status_5 | −1-32767 | Cassette #5 status: [See meanings above.] |
| cass_status_6 | −1-32767 | Cassette #6 status: [See meanings above.] |
| entry_status | 0-32767 | Safe status: 0 = Safe closed; 1 = Safe open |
| payout_amount | 0-2147483647 | Amount (cents) of payouts vended from a change safe |
| env_check_amt | 0-2147483647 | Amount (cents) of checks dropped in envelopes |
| food_stamp_amt | 0-2147483647 | Amount (cents) of food stamps dropped in envelopes |
| sequence_no | 0-1000 | Deposit number for the first listed business day |
| change_fund | 0-2147483647 | Change fund amount (cents) deposited during period |
| cat2_sales | 0-2147483647 | Total amount of Category 2 sales entered this period |

NOTE:
[A] A leading zero does not appear for date of the month in the range 1-9.
[B] This element is absent in current reports.

XML Response Format (Cassette Report):

```
<Cassette>
  <ContentNo>content_rpt_no</ContentNo>
  <SealNo>seal_number</SealNo>
  <CassCash>cassette_cash</CassCash>
  <NoRecBill>recog_bills</NoRecBill>
  <UnrecBill>unrecog_bills</UnrecBill>
  <Status>cass_status</Status>
</Cassette>
```

Cassette Report(s) Response Field Definitions:

| FIELD | RANGE | DESCRIPTION |
| --- | --- | --- |
| content_rpt_no | 1-65534 | Content report number |
| seal_number | 0-4294967295 | Cassette seal number |
| cassette_cash | 0-2147483647 | Amount of recognized cash (cents) in the cassette |
| recog_bills | 0-65535 | Number of recognized bills in the cassette |
| unrecog_bills | 0-65535 | Number of unrecognized bills in the cassette |
| cass_status | −1-32767 | Cassette #1 status: <br> −1 = Status unknown 0 = Cassette installed <br> 1 = Cassette removed 2 = Cassette replaced <br> 5 = Cassette being replaced |

XML Response Format (Day and Partial Day Reports): With one exception, Section 2.4.2.3, which describes the response format for all day reports, also describes all day and partial day reports associated with a content report. The exception is that all day-type reports within a content report have <OldDay> as the day report tag, to wit:

| | |
| --- | --- |
| <OldDay> | [NOTE: <CurDay> is not used in content reports.] |
| </OldDay> | [NOTE: <CurDay> is not used in content reports.] |

Day and Partial Day Report Response Field Definitions: See section 2.4.2.3 for response field definitions of day-type reports within a content report.

XML Response Format (Envelope Reports):

```
<Envelope>
  <ContentNo>content_rpt_no</ContentNo>
  <BussDate>business_date</BussDate>
  <TicketNo>env_ticket_no</TicketNo>
  <ItemCount>envelope_items</ItemCount>
  <EnvCash>env_cash_amt</EnvCash>
  <NonCash>env_noncash_amt</NonCash>
  <Check>env_check_amt</Check>
  <FoodStamp>food_stamp_amt</FoodStamp>
  <DayNo>day_rpt_no</DayNo>
  <CashierId>cashier_id</CashierId>
  <TypeDrop>type_drop</TypeDrop>
  <DropTime>drop_time</DropTime>
</Envelope>
```

Response Field Definitions:

| FIELD | RANGE/LENGTH | DESCRIPTION |
|---|---|---|
| content_rpt_no | 1-65534 | Content report number |
| business_date | 25[A] or 26 char. | Starting time of the business day of the drop. [Format: hh:mm:ss, ODD, dd[A] MMM yyyy] |
| env_ticket_no | 1-65534 | Envelope ticket number of drop. [Wraps from 65534 to 1.] |
| envelope_items | 0-32767 | Number of items deposited in the envelope drop |
| env_cash_amt | 0-2147483647 | Total amount of cash (cents) dropped in envelope |
| env_noncash_amt | 0-2147483647 | Total amount of non-cash (cents) dropped in envelope |
| env_check_amt | 0-2147483647 | Total amount (cents) of checks dropped in envelope |
| food_stamp_amt | 0-2147483647 | Total amount (cents) of food stamps dropped in envelope |
| day_rpt_no | 1-65534 | Day report number which contains the envelope drop |
| cashier_id | 1-65535 | Identification number of the cashier who made the drop |
| type_drop | 0-255 | Type of drop: 0 = cash; 1 = check; 2 = food stamps |
| drop_time | 25[A] or 26 char. | Time of the envelope drop. [Format: hh:mm:ss, ODD, dd[A] MMM yyyy] |

NOTE:
[A]A leading zero does not appear for date of the month in the range 1-9.

XML Response Format (CDU Overlimit Report):

```
<OvrLimit>
  <Time>event_time</Time>
  <ContentNo>content_rpt_no</ContentNo>
  <DayNo>day_rpt_no</DayNo>
  <AmtOver>amt_over_limit</AmtOver>
  <AuditNo>audit_no</AuditNo>
</OvrLimit>
```

Response Field Definitions (CDU Overlimit Report):

| FIELD | RANGE/LENGTH | DESCRIPTION |
|---|---|---|
| event_time | 25[A] or 26 char. | Time of the overlimit event. [Format: hh:mm:ss, ODD, dd[A] MMM yyyy] |
| content_rpt_no | 1-65534 | Content report number on which the overlimit occurred |
| day_rpt_no | 1-65534 | Day report number on which the overlimit occurred |
| amt_over_limit | 0-2147483647 | Amount (cents) by which the CDU exceeded the limit |
| audit_no | 0-65535 | Audit report number |

NOTE:
[A]A leading zero does not appear for date of the month in the range 1-9.

2.4.2.3 Day Report

Purpose: Provides a designated day report.

Recommendation: To confirm the validity of the day report number used as the argument in this request, ask for the current report numbers (see section 2.4.1.2) before requesting the day report. Recognize that report numbers in a CompuSafe® safe increase from 1 to 65534, then roll over to 1 and repeat. This means that calculated day report numbers ranging from −19 to 0 refer to report numbers 65515 to 65534, respectively. So, if the result of the subtraction is less than or equal to zero, add 65534 to this result to obtain the correct report number.

XML Request Format:

```
<?xml version='1.0'?>
<CSafe>
  <Day>
    <DayNo>day_rpt_no</DayNo>
  </Day>
</CSafe>
```

Request Field Definitions:

| FIELD | RANGE | DESCRIPTION |
|---|---|---|
| day_rpt_no | 1-65534 | Number of desired day report |

XML Response Format:

There are two possible responses to this request: one for the current day report (which is always incomplete) and one for reports of completed, business days. They differ only on the response node name ("CurDay" for current, day reports and "OldDay" for completed, business days) and in the absence of an end time for current day reports:

```
<?xml version='1.0'?>
<CSafe>
 <OldDay>           [NOTE: <CurDay> for current day reports.]
  <DayNo>day_report_no</DayNo>
  <StartTime>start_time</StartTime>
  <EndTime>end_time</EndTime>[Absent in current reports.]
  <EnvCount>envelope_count</EnvCount>
  <UnrecBill>unrecog_bills</UnrecBill>
  <UCRatio>ucr</UCRatio>
  <EnvCash>env_cash_amt</EnvCash>
  <NonCash>env_noncash_amt</NonCash>
  <CassCash>cassette_cash</CassCash>
  <TotalAmt>total_amount</TotalAmt>
  <SalesAmt>sales_amount</SalesAmt>
  <ChgVend>change_vend_amt</ChgVend>
  <Cat2Sales>cat2_sales</Cat2Sales>
  <FirstShft>start_shift</FirstShft>
  <LastShft>end_shift</LastShft> [Absent in current reports.]
  <Payout>payout_amount</Payout>
  <Check>env_check_amt</Check>
  <FoodStamp>food_stamp_amt</FoodStamp>
  <ChgFund>change_fund</ChgFund>
 </OldDay>          [NOTE: </CurDay> for current day reports.]
</CSafe>
```

Response Field Definitions:

| FIELD | RANGE/LENGTH | DESCRIPTION |
| --- | --- | --- |
| day_report_no | 1-65534 | Day report number |
| start_time | $25^A$ or 26 char. | Starting time of the business day. [Format: hh:mm:ss, DDD, $dd^A$ MMM yyyy] |
| end_time$^B$ | $25^A$ or 26 char. | Ending time of the business day. [Format: hh:mm:ss, DDD, $dd^A$ MMM yyyy] |
| envelope_count | 0-65535 | Number of envelope drops made during the day |
| unrecog_bills | 0-65535 | Number of unrecognized bills deposited during the day |
| ucr | 0-1000 | Unverified cash ratio (in tenths of a percent) |
| env_cash_amt | 0-2147483647 | Amount of cash (cents) dropped in envelopes |
| env_noncash_amt | 0-2147483647 | Amount of non-cash (cents) dropped in envelopes |
| cassette_cash | 0-2147483647 | Total cash (cents) deposited in the acceptors |
| total_amount | 0-2147483647 | Sum (cents) of cassette cash and envelope drops |
| sales_amount | 0-2147483647 | Total amount (cents) minus change vends (cents) |
| change_vend_amt | 0-2147483647 | Amount (cents) vended from a change safe |
| cat2_sales | 0-2147483647 | Total amount of Category 2 sales entered this period |
| start_shift | 1-65534 | Shift report number of the first shift for this day |
| end_shift$^B$ | 1-65534 | Shift report number of the last shift for this day |
| payout_amount | 0-2147483647 | Amount (cents) of payouts vended from a change safe |
| env_check_amt | 0-2147483647 | Amount (cents) of checks dropped in envelopes |
| food_stamp_amt | 0-2147483647 | Amount (cents) of food stamps dropped in envelopes |
| change_fund | 0-2147483647 | Change fund amount (cents) deposited during period |

NOTE:
[A] A leading zero does not appear for date of the month in the range 1-9.

[B] This element is absent in current reports.

2.4.2.4 Regular Shift Report

Purpose: Delivers a regular shift report. The safe should be set to Regular shift mode, otherwise this command will return the corresponding Cashier Shift Report (See Section 2.4.2.1) [NOTE: A regular shift is one which begins automatically when the previous shift ended and which may have multiple cashiers.]

Recommendation: To confirm the validity of the shift report number used as the argument in this request, ask for the current report numbers (see section 2.4.1.2) before requesting the content report. Recognize that report numbers in a CompuSafe® safe increase from 1 to 65534, then roll over to 1 and repeat. This means that calculated day report numbers ranging from −34 to 0 refer to report numbers 65500 to 65534, respectively. So, if the result of the subtraction is less than or equal to zero, add 65534 to this result to obtain the correct, initial report number.

XML Request Format:

```
<?xml version='1.0'?>
<CSafe>
 <Shift>
  <ShiftNo>shift_report_no</ShiftNo>
 </Shift>
</CSafe>
```

Request Field Definitions:

| FIELD | RANGE | DESCRIPTION |
| --- | --- | --- |
| shift_report_no | 1-65534 | Desired shift report number |

XML Response Format:

There are two possible responses to this request: one for the current shift report (which is always incomplete) and one for reports of completed shifts. They differ only on the response node name ("CurShift" for current shift reports and "Old-Shift" for completed shifts) and in the absence of an end time for current shift reports:

```xml
<?xml version='1.0'?>
<CSafe>
    <OldShift>          [NOTE: <CurShift> for current shift reports.]
        <ShiftNo>report_no</ShiftNo>
        <DayShftNo>shift_no_of_day</DayShftNo>
        <StartTime>start_time</StartTime>
        <EndTime>end_time</EndTime> [Absent in current reports.]
        <EnvCount>envelope_count</EnvCount>
        <UnrecBill>unrecog_bills</UnrecBill>
        <UCRatio>ucr</UCRatio>
        <EnvCash>env_cash_amt</EnvCash>
        <NonCash>env_noncash_amt</NonCash>
        <CassCash>cassette_cash</CassCash>
        <TotalAmt>total_amount<TotalAmt>
        <SalesAmt>sales_amount</SalesAmt>
        <ChgVend>change_vend_amt</ChgVend>
        <Payout>payout_amount</Payout>
        <Check>env_check_amt</Check>
        <FoodStamp>food_stamp_amt</FoodStamp>
    </OldShift>         [NOTE: </CurShift> for current shift reports.]
</CSafe>
```

Response Field Definitions:

| FIELD | RANGE/LENGTH | DESCRIPTION |
|---|---|---|
| report_no | 1-65534 | Regular shift report number |
| shift_no_of_day | 1-65535 | Shift number of the day. Starts with 1 at the beginning of a business day, and increments by 1 for each shift during the business day. |
| start_time | 25[A] or 26 char. | Starting time of the shift. [Format: hh:mm:ss, DDD, dd[A] MMM yyyy] |
| end_time[B] | 25[A] or 26 char. | Starting time of the shift. [Format: hh:mm:ss, DDD, dd[A] MMM yyyy] |
| envelope_count | 0-65535 | Number of envelope drops made during the shift. |
| unrecog_bills | 0-65535 | Number of unrecognized bills deposited during the shift |
| ucr | 0-1000 | Unverified cash ratio (in tenths of a percent) |
| env_cash_amt | 0-2147483647 | Amount of cash (cents) dropped in envelopes |
| env_noncash_amt | 0-2147483647 | Amount of non-cash (cents) dropped in envelopes |
| cassette_cash | 0-2147483647 | Total cash (cents) deposited in the acceptors |
| total_amount | 0-2147483647 | Sum (cents) of cassette cash and envelope drops |
| sales_amount | 0-2147483647 | Total amount (cents) minus change vends (cents) |
| change_vend_amt | 0-2147483647 | Amount (cents) vended from a change safe |
| payout_amount | 0-2147483647 | Amount (cents) of payouts vended from a change safe |
| env_check_amt | 0-2147483647 | Amount (cents) of checks dropped in envelopes |
| food_stamp_amt | 0-2147483647 | Amount (cents) of food stamps dropped in envelopes |

NOTES:
[A]A leading zero does not appear for date of the month in the range 1-9.
[B]This element is absent in current reports

2.4.3 Commands to the CompuSafe® Safe

In general, not only can attached, XML users obtain information, report, and data records from a CompuSafe® safe, then can also issue instructions for the safe to execute. Currently, however, the safe is receptive to only one command: change the current, business day.

2.4.3.1 Business Day Change

Purpose: This command causes the CompuSafe® safe to end the current, business day on the CompuSafe® safe. In order for this command to work "Interface Closes Safe Day" should be set (see Diagram 1.3.2). A Day Report will only be printed if "Print Report on Interface Close" is selected.

The safe can end only the current day, which the command must designate by number. (NOTE: Requiring designation of the business day in this command ensures that the safe will not allow duplicate requests to cause multiple ends of current days.)

Recommendation: To identify the day report number used as the argument in this command, ask for the current report numbers (see section 2.4.1.2) before issuing the day change.

XML Request Format:

```xml
<?xml version='1.0'?>
<CSafe>
    <ChgDay>
        <DayNo>day_to_end</DayNo>
    </ChgDay>
</CSafe>
```

Request Field Definitions:

| FIELD | RANGE | DESCRIPTION |
|---|---|---|
| Day_to_end | 0-65534 | Day report number of day to end. |

XML Response Format:

```xml
<?xml version.='1.0'?>
<CSafe>
    <ChgDay>
        <Result>result</Result>
    </ChgDay>
</CSafe>
```

Response Field Definitions:

| FIELD | RANGE | DESCRIPTION |
|---|---|---|
| result | −32767-0 | Result of end-of-day request:<br>0 = OK (Safe ended designated day, as requested.)<br><0 = Error condition:<br>−10300 = Invalid day report number in request.<br>[Safe can end only the current day.]<br>Other errors are internal (to the CompuSafe) errors.<br>[Contact Brink's if they occur.] |

2.4.3.2 Bill Validator Drop

Starting a Drop:

When starting a drop, if the cashier does not have an active shift then one is automatically started for the cashier.
The DropId is a unique number for each drop. The numbers are sequential and may wrap back around to 1 (so long as a unique number is maintained for all drops in the database).

XML Request Format:

```
<?xml version='1.0'?>
<CSafe>
  <StartBVDrop>
    <Name>Chris</Name>
    <PIN>111</PIN>
  </StartBVDrop>
</CSafe>
```

Request Field Definitions:

| FIELD | Type/Range | DESCRIPTION |
|---|---|---|
| Name | Alpha-numeric - 32 characters max | Name of employee to start drop. External device can supply Name, PIN, or both to identify the employee for the drop. |
| PIN | Numeric - 10 digits max | PIN code of employee to start drop. External device can supply Name, PIN, or both to identify the employee for the drop. |

XML Response Format:

```
<?xml version='1.0'?>
<CSafe>
  <StartBVDrop>
    <Name>Chris</Name>
    <PIN>111</PIN>
    <Result>result</Result>
    <DropId>1234</DropId>
  </StartBVDrop>
</CSafe>
```

Response Field Definitions:

| FIELD | RANGE | DESCRIPTION |
|---|---|---|
| Result | | "OK" - means command was accepted and safe has started BV drop for specified employee - the DropId field will contain the unique identifier for the drop<br>"BadLogin" - means name/pin is not valid on safe<br>"NotAuthorized" - means name/pin does not have authority to perform drop<br>"Busy" - safe is busy and can't start drop |
| DropId | | If result was OK, this specifies the unique identifier for the drop. The DropId will be used to query status of the drop and to complete the drop. |
| Name | | Name that was sent in request. Not present if name was not sent in request. |
| PIN | | PIN that was sent in the request. Not present if pin was not sent in the request. |

Getting Drop Status:

XML Request Format:

```
<?xml version='1.0'?>
<CSafe>
  <BVDropStatus>
    <DropId>1234</DropId>
  </BVDropStatus>
</CSafe>
```

Request Field Definitions:

| FIELD | Type/Range | DESCRIPTION |
|---|---|---|
| *DropId* | | The unique identifier for the drop. |

XML Response Format:

```
<?xml version='1.0'?>
<CSafe>
  <BVDropStatus>
    <DropId>1234</DropId>
    <Result>result</Result>
  </BVDropStatus>
</CSafe>
```

Response Field Definitions:

| FIELD | RANGE | DESCRIPTION |
|---|---|---|
| Result | | "Invalid" - the DropId does not specify a valid drop.<br>"Active" - the drop session specified by DropId is still active<br>"Stopping" - the drop session is currently being stopped<br>"Complete" - the drop session is complete and totals are available. |
| DropId | | DropId that was sent in the request. |

Stopping an Active Drop Session:

XML Request Format:

```
<?xml version='1.0'?>
<CSafe>
  <StopBVDrop>
    <DropId>1234</DropId>
  </StopBVDrop>
</CSafe>
```

Request Field Definitions:

| FIELD | Type/Range | DESCRIPTION |
|---|---|---|
| *DropId* | | The unique identifier for the drop. |

XML Response Format:

```
<?xml version='1.0'?>
<CSafe>
  <StopBVDrop>
    <DropId>1234</DropId>
    <Result>result</Result>
  </StopBVDrop>
</CSafe>
```

Response Field Definitions:

| FIELD | RANGE | DESCRIPTION |
|---|---|---|
| Result | | "OK" - the drop session will be stoped.<br>"Invalid" - the DropId does not specify a valid active drop.<br>"Complete" - the drop has already been stopped.<br>"Busy" - the bill validators are busy accepting a note and the drop can not be stopped. |
| DropId | | DropId that was sent in the request. |

Getting Totals for a Drop Session:
XML Request Format:

```
<?xml version='1.0'?>
<CSafe>
  <BVDropTotals>
    <DropId>1234</DropId>
  </BVDropTotals>
</CSafe>
```

Request Field Definitions:

| FIELD | Type/Range | DESCRIPTION |
|---|---|---|
| *DropId* | | The unique identifier for the drop. |

XML Response Format:

```
<?xml version='1.0'?>
<CSafe>
  <BVDropTotals>
    <Result>result</Result>
    <DropId>1234</DropId>
    <Name>Chris</Name>
    <CashTotal>100.00</CashTotal>
  </BVDropTotals>
</CSafe>
```

Response Field Definitions:

| FIELD | RANGE | DESCRIPTION |
|---|---|---|
| Result | | "OK" - the totals for the drop have been returned<br>"Invalid" - DropId does not specified a valid drop |
| | | "Active" - the drop is still active<br>"Stopping" - the drop session is currently being stopped |
| Name | | Name of employee that performed the drop. |
| CashTotal | | If result was OK this tells the total amount of cash deposited into the bill validators during the drop session. |
| DropId | | DropId that was sent in the request. |

2.4.3.3 Manual Drop

Record a Drop on the Safe:

When starting a drop, if the cashier does not have an active shift then one is automatically started for the cashier.

The envelope number for the manual drop is a unique identifier for the drop. It starts at 1 and is sequential. The number will wrap from 65534 back to 1.

XML Request Format:

```
<?xml version='1.0'?>
<CSafe>
  <ManualDrop>
    <Name>Chris</Name>
    <PIN>111</PIN>
    <Type>CS</Type>
    <Amount>100.00</Amount>
  </ManualDrop>
</CSafe>
```

Request Field Definitions:

| FIELD | Type/Range | DESCRIPTION |
|---|---|---|
| *Name* | Alpha-numeric - 32 characters max | Name of employee for drop. External device can supply Name, PIN, or both to identify the employee for the drop. |
| *PIN* | Numeric - 10 digits max | PIN code of employee for drop. External device can supply Name, PIN, or both to identify the employee for the drop. |
| *Type* | Alpha-numeric - 2 characters | Type of drop:<br>CS for cash<br>CK for check |
| *Amount* | | Dollar amount of drop. Limit is ????. |

XML Response Format:

```
<?xml version='1.0'?>
<CSafe>
  <ManualDrop>
    <Name>Chris</Name>
    <PIN>111</PIN>
    <Type>CS</Type>
    <Amount>100.00</Amount>
    <Result>result</Result>
    <EnvelopeNumber>1234</EnvelopeNumber>
  </ManualDrop>
</CSafe>
```

Response Field Definitions:

| FIELD | RANGE | DESCRIPTION |
|---|---|---|
| Result | | "OK" - means command was accepted and safe has recorded the manual drop.<br>"BadLogin" - means name/pin is not valid on safe |

-continued

| FIELD | RANGE | DESCRIPTION |
|---|---|---|
| | | "NotAuthorized" - means name/pin does not have authority to perform drop
"Busy" - safe is busy and can't start drop
"BadType" - type of drop is not recognized by the system
"BadAmount" - can't drop that amount |
| Enve-lopeNumber | | If result was OK, this specifies the unique identifier for the manual drop. This matches the number that is printed on the ticket. |
| Name | | Name that was sent in the request. Not present if name was not sent in the request. |
| PIN | | PIN that was sent in the request. Not present if pin was not sent in the request. |
| Type | | Drop type that was sent in the request. |
| Amount | | Amount that was sent in the request. |

Get Info on a Drop:
XML Request Format:

```
<?xml version='1.0'?>
<CSafe>
  <GetManualDrop>
    <EnvelopeNumber>1234</EnvelopeNumber>
  </GetManualDrop>
</CSafe>
```

Request Field Definitions:

| FIELD | Type/Range | DESCRIPTION |
|---|---|---|
| *EnvelopeNumber* | | The unique identifier for the manual drop. |

XML Response Format:

```
<?xml version='1.0'?>
<CSafe>
  <GetManualDrop>
    <Result>result</Result>
    <EnvelopeNumber>1234</EnvelopeNumber>
    <Name>Chris</Name>
    <Amount>100.00</Amount>
  </GetManualDrop>
</CSafe>
```

Response Field Definitions:

| FIELD | RANGE | DESCRIPTION |
|---|---|---|
| Result | | "OK" - means manual drop info was found.
"Invalid" - manual drop info not found |
| EnvelopeNumber | | Envelope number that was sent in the request. |
| Name | | If result was OK, this is the name of the employee that made the drop |
| Type | | If result was OK, this is the type of drop (CS or CK) |
| Amount | | If result was OK, this is the amount of the drop. |

What is claimed is:

1. A process of carrying out a financial transaction, comprising the steps of:
prompting, by a point-of-sale (POS) terminal, a user of the POS terminal to initiate a drop function;
receiving, by the POS terminal from the user, a commence drop function instruction;
transmitting, by the POS terminal to a drop safe, a drop request;
transmitting, by the drop safe to the POS terminal upon acceptance of the drop request by the drop safe, a unique Drop ID representing the respective drop to be carried out;
receiving, by a currency acceptor of the drop safe after acceptance of the drop request, currency;
identifying, by the drop safe, an amount of each received currency;
completing the drop function; and
transmitting, by the drop safe to the POS terminal, a total amount of the currency received by the drop safe.

2. The process of claim 1, wherein the step of prompting the user of the POS terminal to initiate the drop function is carried out during a transaction for a purchase of goods or services by a customer, and the user of the POS terminal is a cashier of a retailer from which the customer is purchasing the goods or services.

3. The process of claim 2, further comprising receiving, by the POS terminal, a total amount of the cost to purchase the goods or services by the customer; and wherein the step of prompting the user of the POS terminal to initiate the drop function is executed upon the POS terminal's receipt of the total amount of the cost to purchase the goods or services by the customer.

4. The process of claim 2, further comprising the steps of ascertaining, by the POS terminal, an identity of each item to be purchased by the customer; ascertaining, by the POS terminal, a respective cost of each identified item to be purchased; and ascertaining, by the POS terminal, a total amount of the cost to purchase all the items to be purchased by the customer; and wherein the step of prompting the user of the POS terminal to initiate the drop function is executed upon the POS terminal's ascertaining of the total amount of the cost to purchase all the items to be purchased by the customer.

5. The process of claim 1, wherein receiving, by the POS terminal from the user, a commence drop function instruction comprises identifying, by the POS terminal, of a selection by the user of a dedicated input key on the POS terminal.

6. The process of claim 1, further comprising:
prompting, by the POS terminal in response to receipt of the drop function instruction, the user to enter a tender type;
receiving, by the POS terminal from the user, the tender type, wherein the received tender type is one of a bill validator drop and a manual drop;
wherein the step of receiving currency by the currency acceptor of the drop safe is commenced only if the received tender type is a bill validator drop.

7. The process of claim 6, comprising receiving, by the drop safe, a manual drop if the received tender type is a manual drop, wherein the manual drop represents an envelope containing at least one of currency and a check.

8. The process of claim 1, further comprising receiving, by the POS terminal, an amount to be dropped, the amount to be dropped representing a total amount of currency to be received by the drop safe.

9. The process of claim 1, further comprising verifying, by the drop safe, an appropriateness of the drop request, wherein the drop safe does not accept the drop request if the drop request is not verified to be appropriate.

10. The process of claim 9, comprising transmitting, by the POS terminal to the drop safe, an identification of the user of the POS terminal; and wherein the step of verifying, by the drop safe, the appropriateness of the drop request includes verifying the transmitted identification of the user of the POS terminal.

11. The process of claim 1, wherein the Drop ID is associated with an amount of the respective drop, an identity of the user of the POS terminal, and the date and time of the respective drop.

12. The process of claim 1, wherein the step of receiving currency comprises receiving by the currency acceptor of the drop safe currency that is manually fed by the user of the POS terminal.

13. The process of claim 1, comprising transferring, by the drop safe, each received currency within a secure, internal cassette disposed within the drop safe.

14. The process of claim 1, wherein completing the drop function occurs after receipt, by one of the POS terminal and the drop safe, from the user of an instruction designating the drop is complete.

15. The process of claim 1, further comprising:
prompting, by the POS terminal in response to receipt of the drop function instruction, the user to enter a tender type; and
receiving, by the POS terminal from the user, the tender type, wherein the received tender type is one of a bill validator drop and a payment by check,
wherein the step of receiving currency by the currency acceptor of the drop safe is commenced only if the received tender type is a bill validator drop; and
the process further comprising:
scanning, by an imager in or associated with the drop safe, a check to produce an image file if the received tender type is payment by check.

16. The process of claim 15, further comprising capturing, by the drop safe, select information from the image file representing the scanned check, the select information including at least one of a payee, an amount of the check, and a routing/account number of the check.

17. The process of claim 15, further comprising transmitting, by the drop safe to the POS terminal, the image file of the check; and printing, by the POS terminal, a receipt having printed thereon an image of the check using the transmitted image file.

18. The process of claim 1, comprising initiating, by the POS terminal, an End-of-Day process, wherein the POS terminal, upon initiating the End-of-Day process transmits to the drop safe an end-of-day instruction; and effecting a change of business day, by the drop safe, upon receipt of the end-of-day instruction.

19. The process of claim 1, comprising initiating, by the POS terminal, a print select report process, wherein the POS terminal, upon initiating the print select report process transmits to the drop safe a request for a select report; transmitting, by the drop safe to the POS terminal, report data corresponding to the requested report; and printing, by the POS terminal, a report using the report data transmitted by the drop safe.

20. The process of claim 19, wherein the select report is one of cashier detail report, a regular shift report and a day report.

21. The process of claim 1, wherein the step of prompting the user of the POS terminal to initiate the drop function is carried out during a bill payment transaction in which a customer desires to pay a bill; and wherein the currency received by the drop safe is from the customer for the purpose of paying the bill.

22. A process of carrying out a financial transaction, comprising the steps of:
prompting, by a point-of-sale (POS) terminal, a user of the POS terminal to initiate a drop function;
receiving, by the POS terminal from the user, a commence drop function instruction;
transmitting, by the POS terminal to a drop safe, a drop request;
transmitting, by the drop safe to the POS terminal upon acceptance of the drop request by the drop safe, a unique Drop ID representing the respective drop to be carried out;
receiving, by a currency acceptor of the drop safe after acceptance of the drop request, currency;
periodically querying, by the POS terminal, the drop safe to ascertain a status of the drop safe while receiving the currency;
identifying, by the drop safe, an amount of each received currency;
completing the drop function; and
transmitting, by the drop safe to the POS terminal, a total amount of the currency received by the drop safe.

23. The process of claim 22, wherein the POS terminal, during each query, transmits the Drop ID to the drop safe; and the drop safe, in response to each said query, transmits the status of drop activity corresponding to the transmitted Drop ID, the status of drop activity being at least one of active, stopping and complete; and wherein the periodically querying step is discontinued by the POS terminal after receiving complete as the status of drop activity.

* * * * *